(12) United States Patent
Onderwater et al.

(10) Patent No.: US 11,848,116 B2
(45) Date of Patent: Dec. 19, 2023

(54) IRRADIATING TARGET MATERIAL LOCATED IN A SURROGATE FUEL BUNDLE IN A CANDU REACTOR FOR ISOTOPE PRODUCTION

(71) Applicant: BWXT Isotope Technology Group, Inc., Lynchburg, VA (US)

(72) Inventors: Thomas G. Onderwater, Peterborough (CA); Benjamin D. Fisher, Lynchburg, VA (US)

(73) Assignee: BWXT Isotope Technology Group, Inc., Lynchburg, VA (US)

( * ) Notice: Subject to any disclaimer, the term of this patent is extended or adjusted under 35 U.S.C. 154(b) by 0 days.

(21) Appl. No.: 17/750,655

(22) Filed: May 23, 2022

(65) Prior Publication Data
US 2022/0293291 A1 Sep. 15, 2022

Related U.S. Application Data

(62) Division of application No. 16/052,964, filed on Aug. 2, 2018, now Pat. No. 11,342,086.
(Continued)

(51) Int. Cl.
*G21G 1/02* (2006.01)
*G21C 23/00* (2006.01)
(Continued)

(52) U.S. Cl.
CPC ............ *G21G 1/02* (2013.01); *G21C 3/326* (2013.01); *G21C 23/00* (2013.01); *G21C 1/16* (2013.01);
(Continued)

(58) Field of Classification Search
CPC .. G21G 1/02; G21G 1/001; G21G 2001/0036; G21G 2001/0042; G21C 3/326; G21C 23/00; G21C 1/16
(Continued)

(56) References Cited

U.S. PATENT DOCUMENTS 3,079,322 A 2/1963 Stockdale
3,086,934 A 4/1963 Morrison
(Continued)

FOREIGN PATENT DOCUMENTS

CA 2950762 A1 * 12/2015 ............... G21G 1/06
KR 20180115486 A * 10/2018 ............. G21G 1/001
(Continued)

OTHER PUBLICATIONS

International Search Report and Written Opinion, PCT/US2018/045007, dated Feb. 15, 2019, 11 pages.
(Continued)

*Primary Examiner* — Jack W Keith
*Assistant Examiner* — Daniel Wasil
(74) *Attorney, Agent, or Firm* — Nelson Mullins Riley & Scarborough LLP

(57) ABSTRACT

A fuel bundle surrogate for the irradiation of a target material, having a plurality of tube sheaths, each tube sheath being parallel to a longitudinal center axis of the fuel bundle surrogate, a plurality of end caps, a pair of end plates, wherein the end plates are disposed at opposing ends of the plurality of tube sheaths, and a first target comprised of a first target material suitable for producing the isotope by way of a neutron capture event, wherein the first target is disposed in a first tube sheath, and wherein the first tube sheath of the plurality of tube sheaths comprises an elongated thickened wall portion and a pair of annular end portions, each annular end portion being disposed on a corresponding end of the thickened wall portion and having a wall thickness that is less than a wall thickness of the thickened wall portion.

19 Claims, 31 Drawing Sheets

Related U.S. Application Data

(60) Provisional application No. 62/540,444, filed on Aug. 2, 2017.

(51) Int. Cl.
    *G21C 3/326* (2006.01)
    *G21G 1/00* (2006.01)
    *G21C 1/16* (2006.01)

(52) U.S. Cl.
    CPC ..... *G21G 1/001* (2013.01); *G21G 2001/0036* (2013.01); *G21G 2001/0042* (2013.01)

(58) Field of Classification Search
    USPC .................. 376/158, 186, 202, 434, 451
    See application file for complete search history.

(56) References Cited

U.S. PATENT DOCUMENTS

| | | |
|---|---|---|
| 3,157,580 A | 11/1964 | Williams |
| 3,411,987 A | 11/1968 | Fitzpatrick |
| 4,822,987 A | 4/1989 | Goldenfield |
| 11,342,086 B2 | 5/2022 | Onderwater et al. |
| 2009/0196390 A1 | 8/2009 | Gahl et al. |
| 2009/0274260 A1 | 11/2009 | Russell, II et al. |
| 2010/0284503 A1 | 11/2010 | Smith et al. |
| 2012/0027152 A1 | 2/2012 | Reese et al. |
| 2013/0170927 A1 | 7/2013 | Dayal et al. |
| 2014/0270045 A1 | 9/2014 | Lounsbury |
| 2014/0307844 A1 | 10/2014 | Russell, II et al. |
| 2018/0322973 A1 | 11/2018 | Fisher et al. |
| 2019/0043630 A1 | 2/2019 | Fisher et al. |

FOREIGN PATENT DOCUMENTS

| | | |
|---|---|---|
| WO | 2015/199372 A1 | 12/2015 |
| WO | 2016/207054 A1 | 12/2016 |

OTHER PUBLICATIONS

Nichita, "Molybdenum-99-producing 37-element fuel bundle neutronically and thermal-hydraulically equivalent to a standard CANDU fuel bundle", NuclearEngineering and Design 307 (2016): 86-95. (Year: 2016).

Wikipedia "Neutron Flux" 24 Apr. 24, 2017, 1 page, Retrieved from https://en.wikipedia.org/w/index.php?title=Neutron_flux&oldid=776930064 On Dec. 7, 2018 (Dec. 7, 2018).

\* cited by examiner

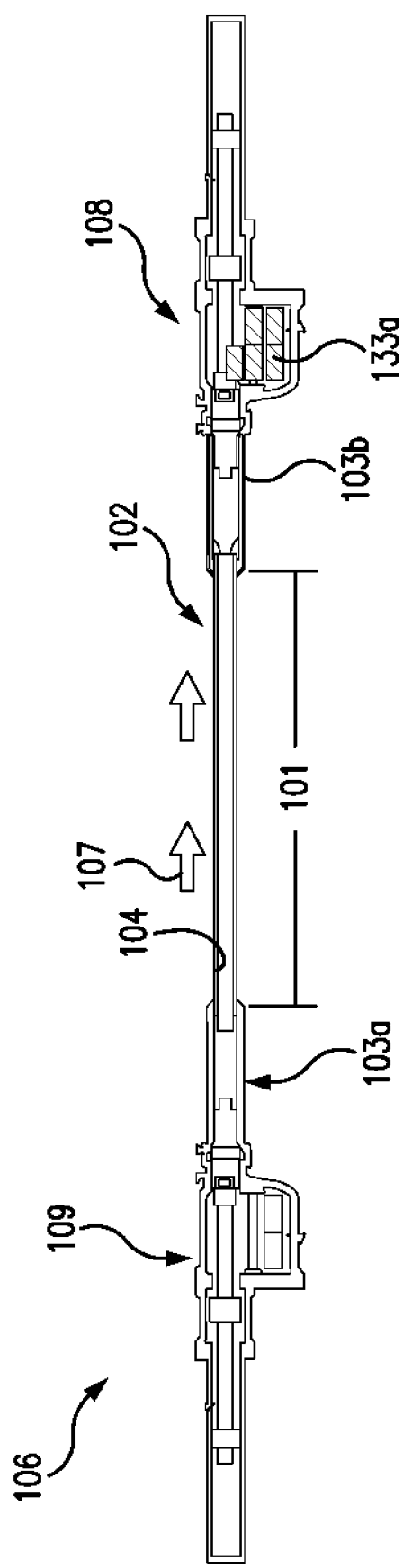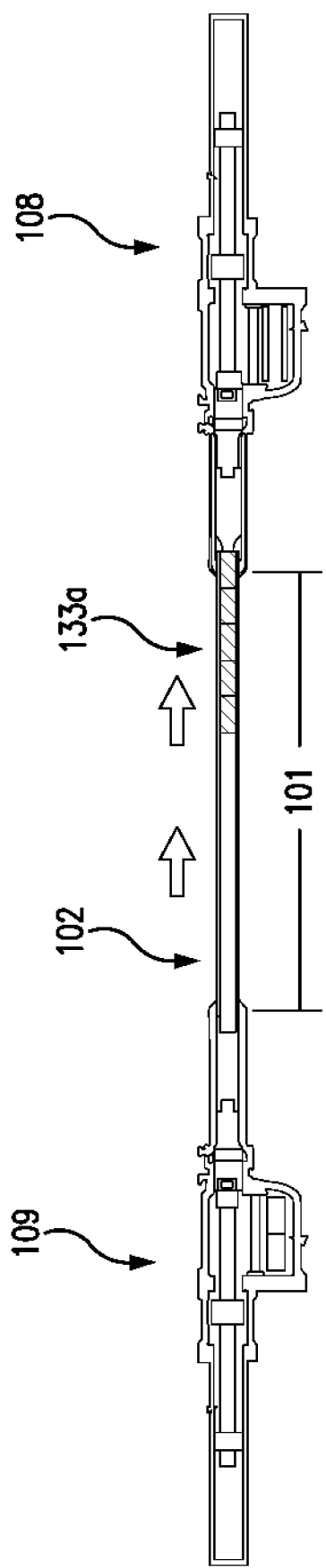
FIG. 4A
FIG. 4B

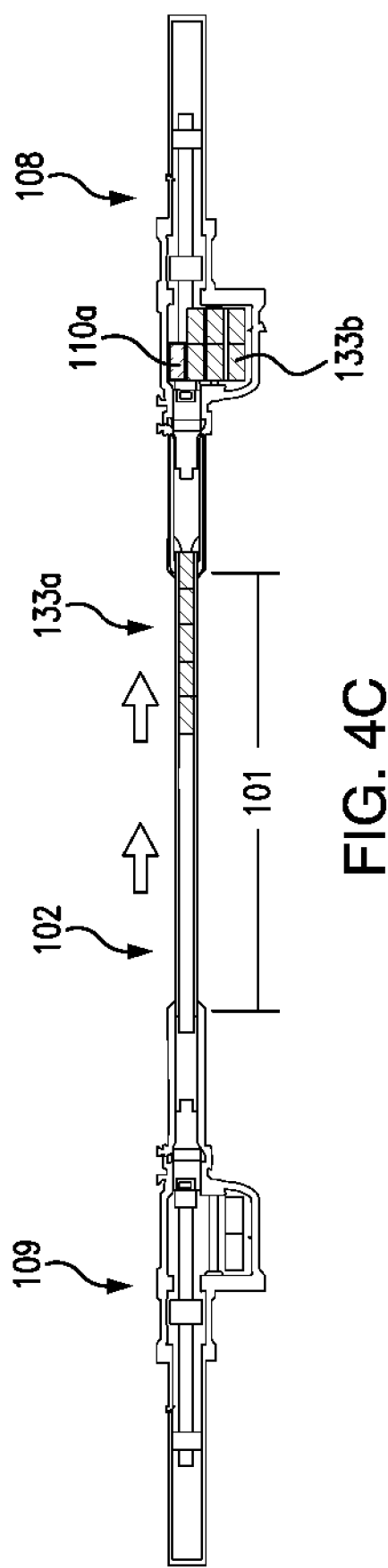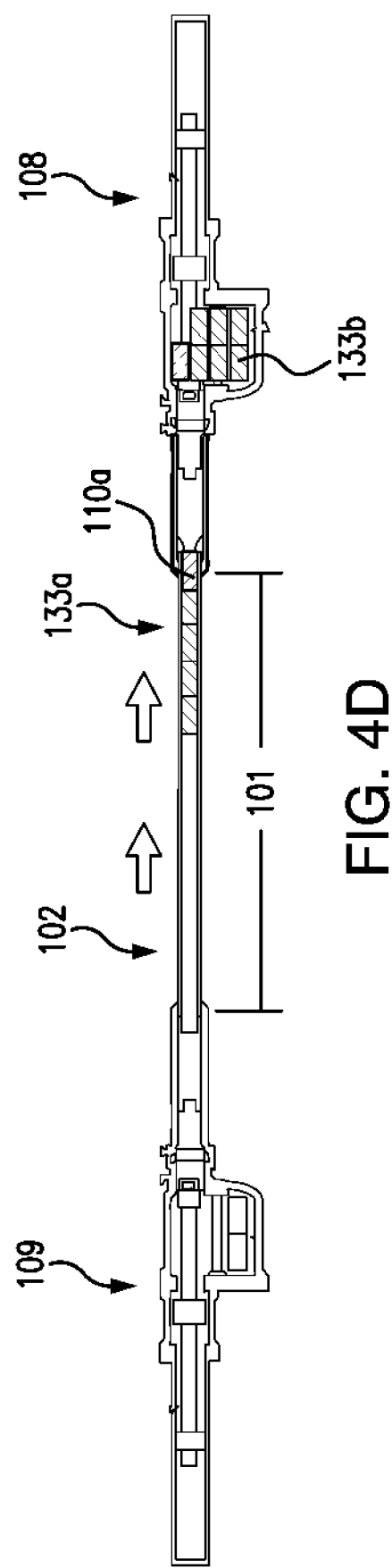

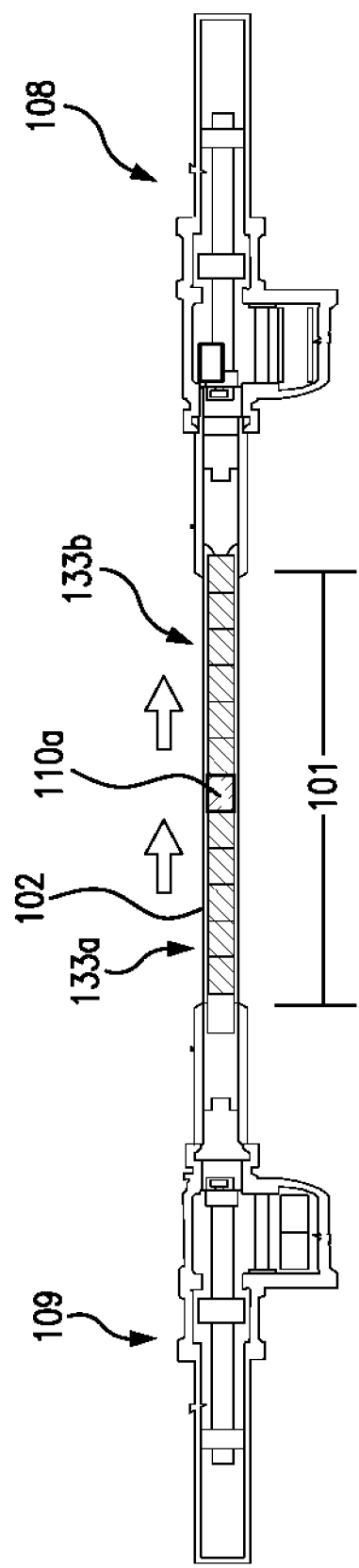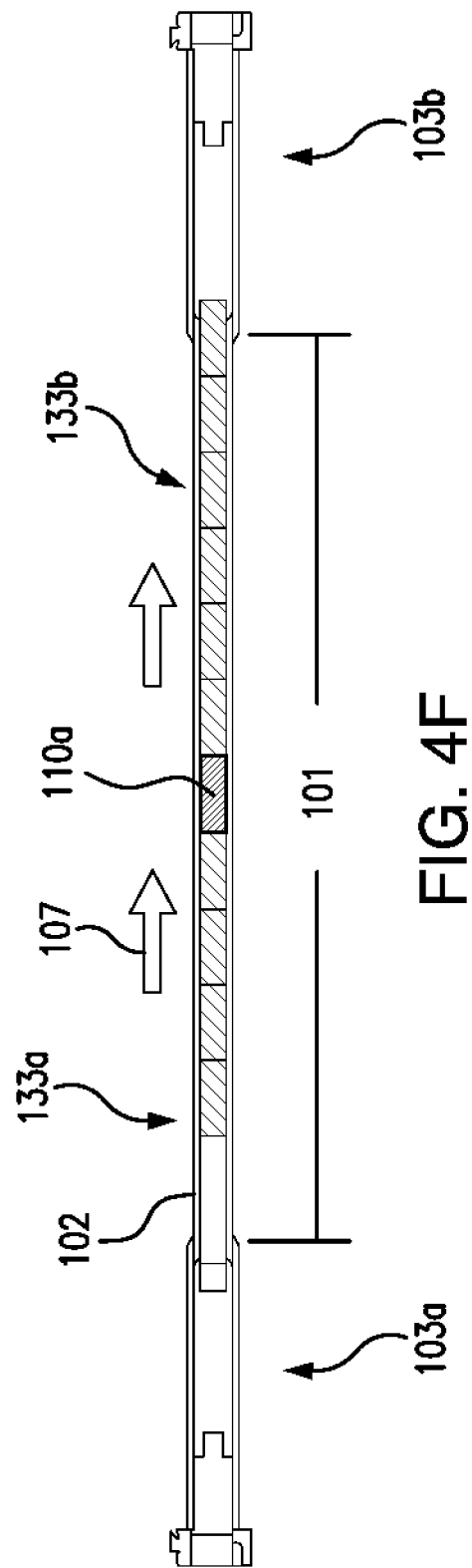

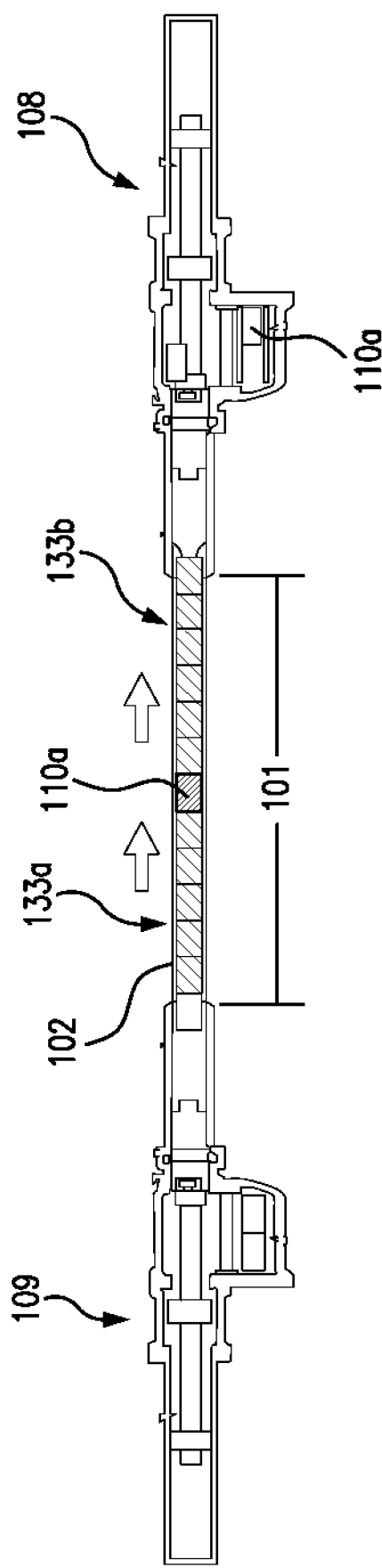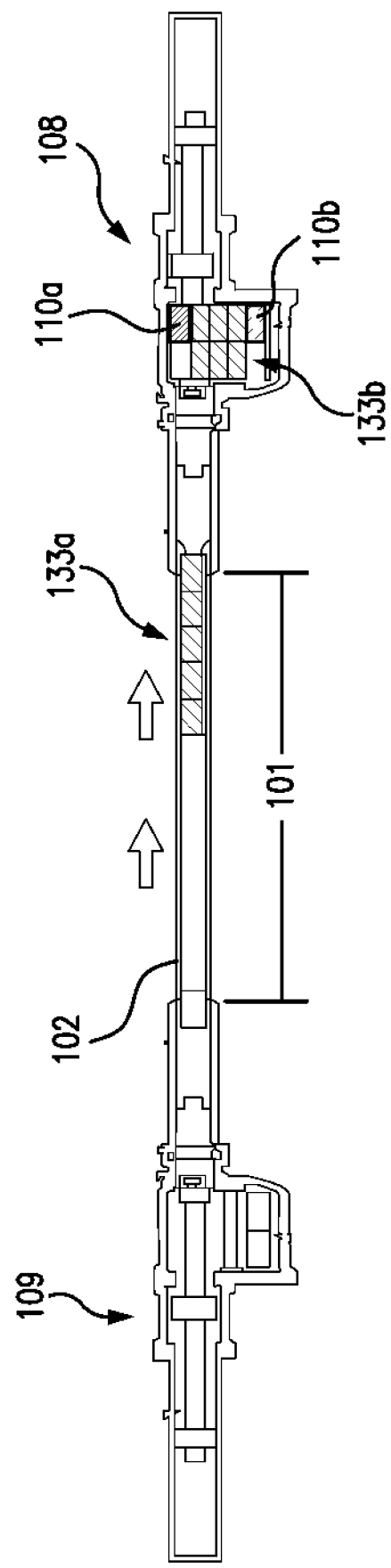

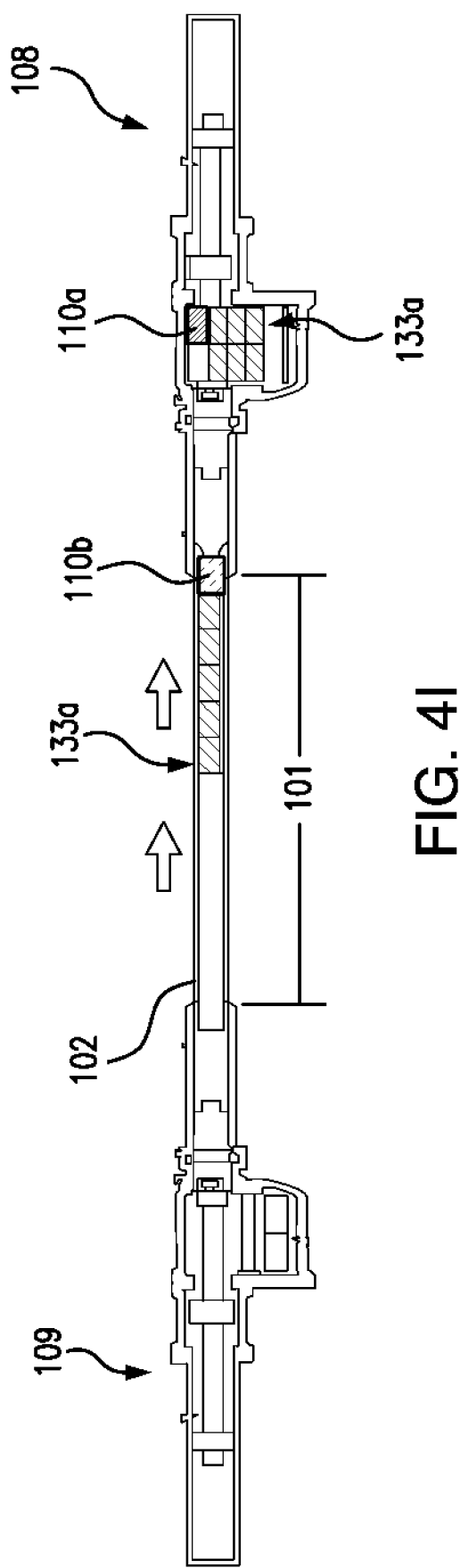
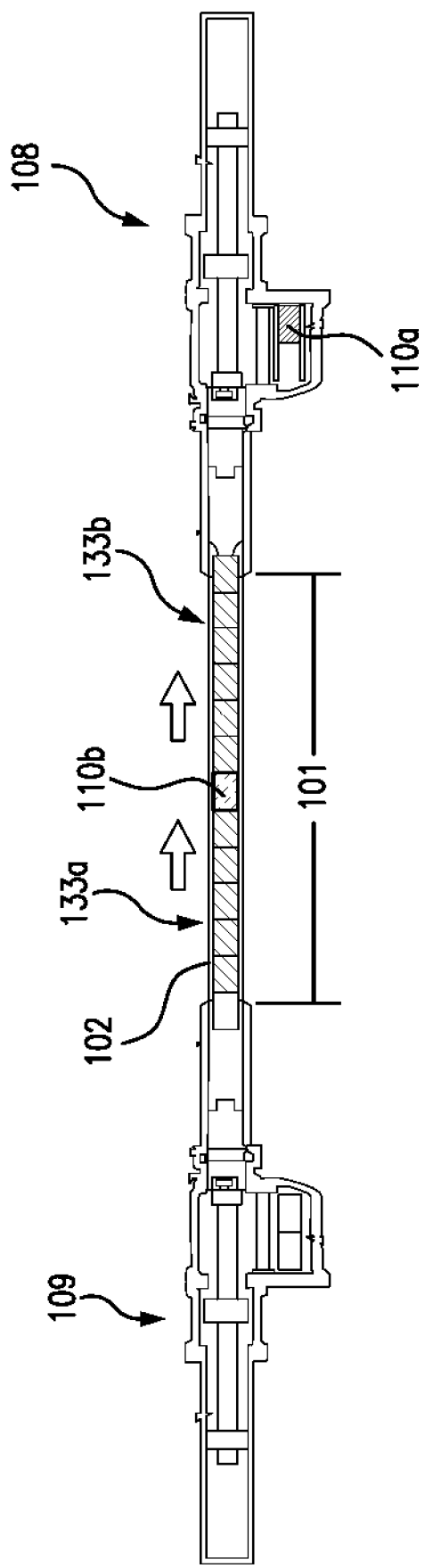
FIG. 4I
FIG. 4J

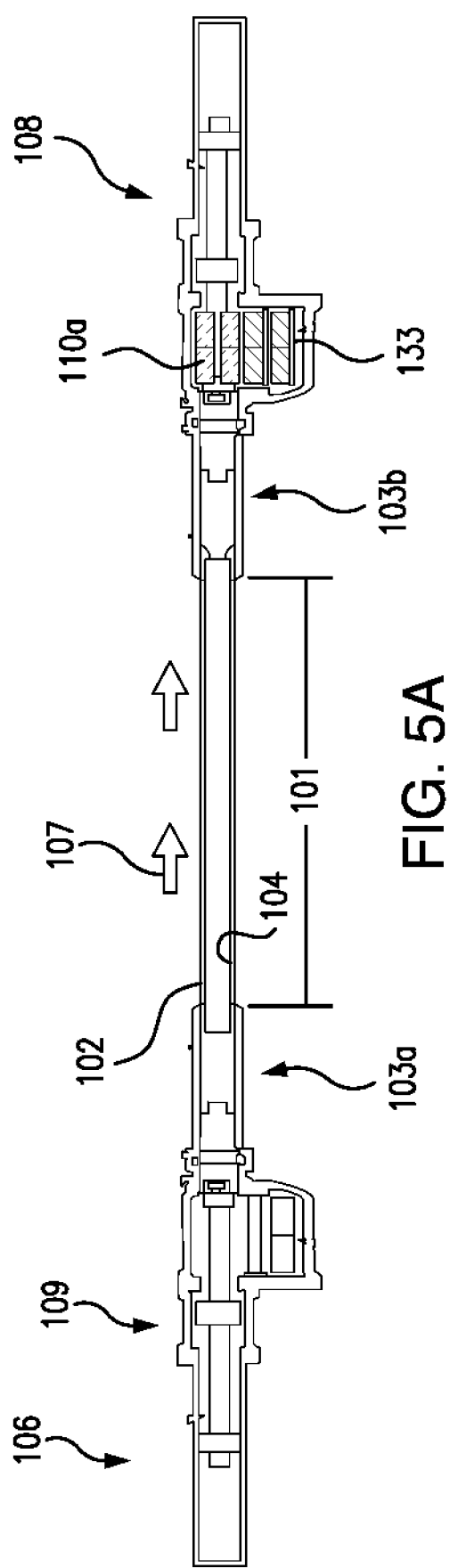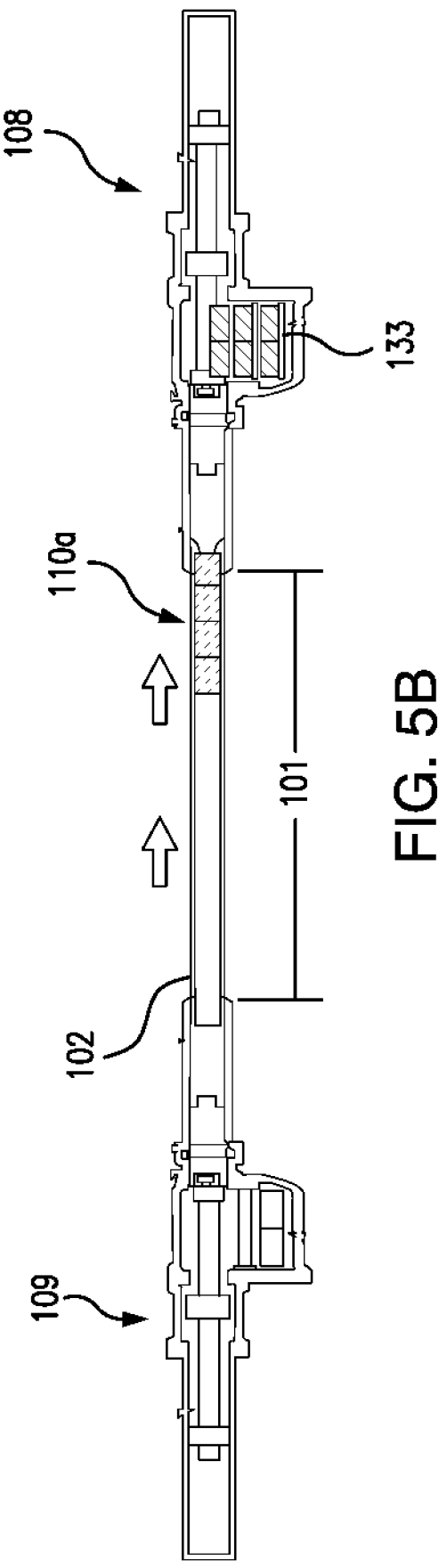

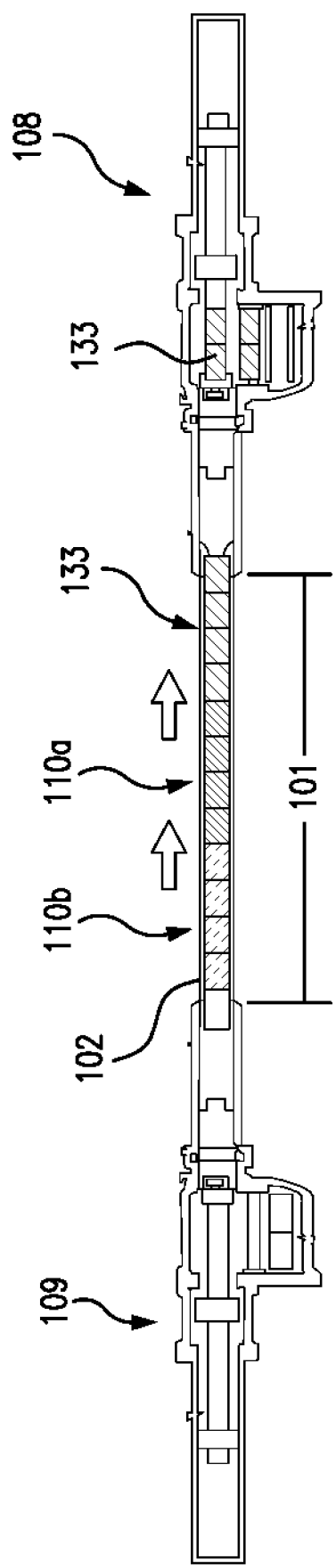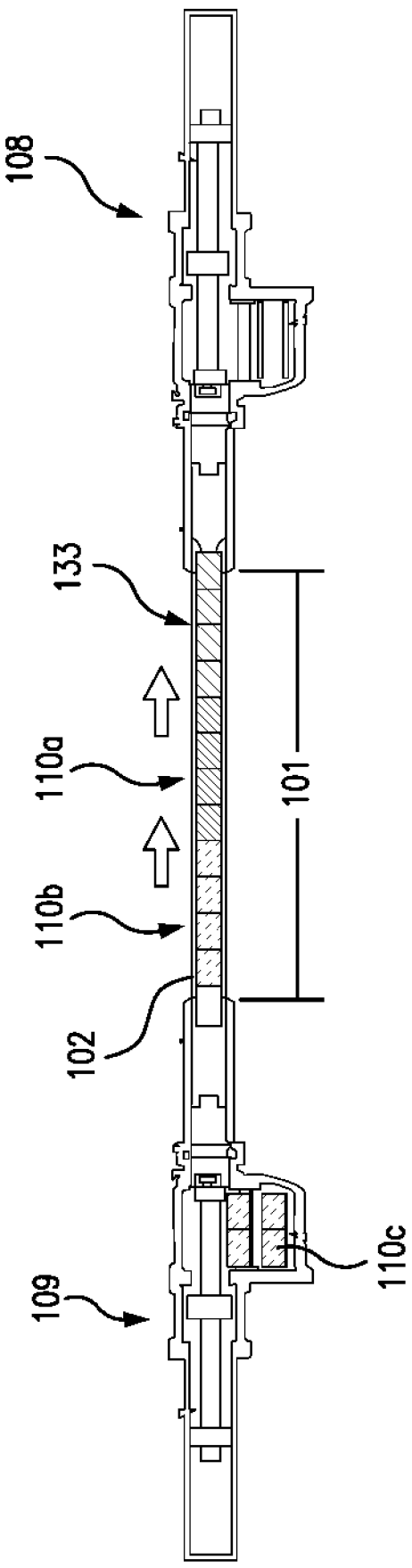
FIG. 5E
FIG. 5F

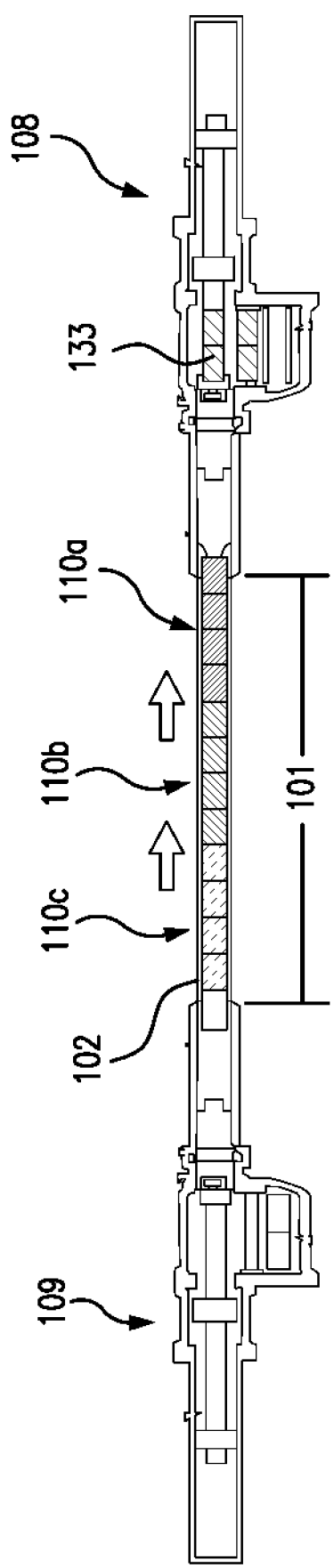
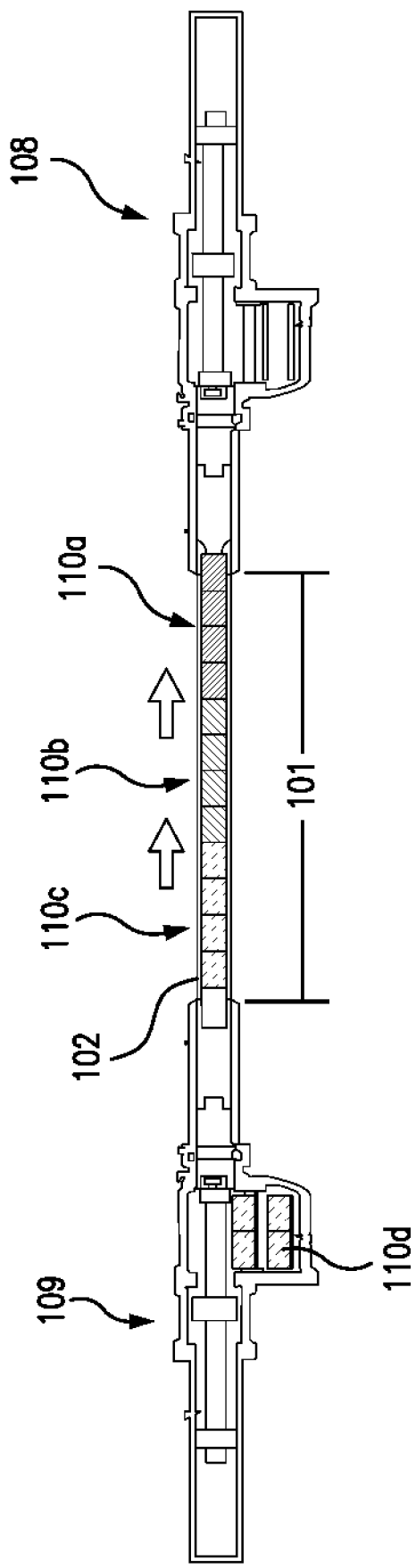

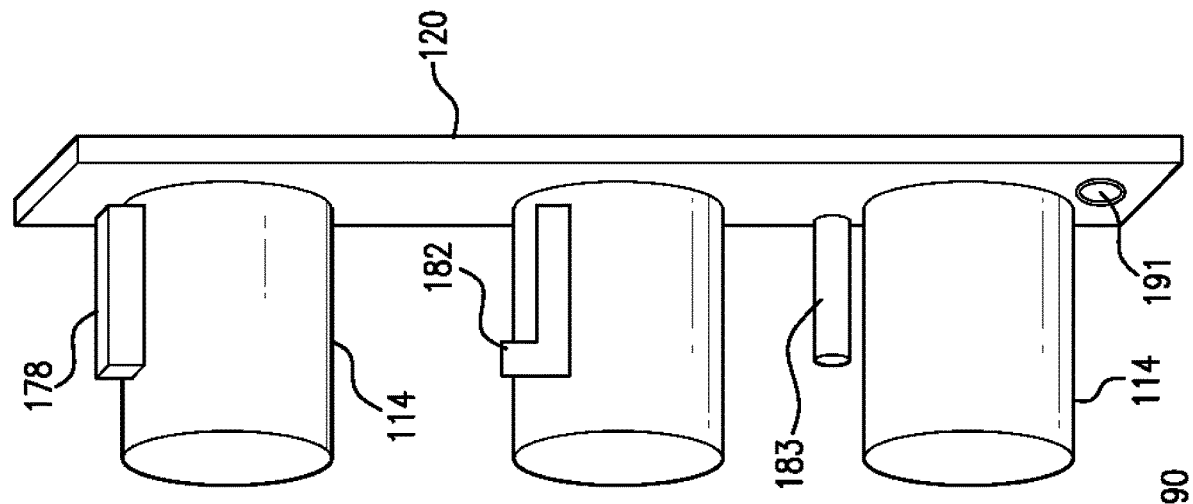
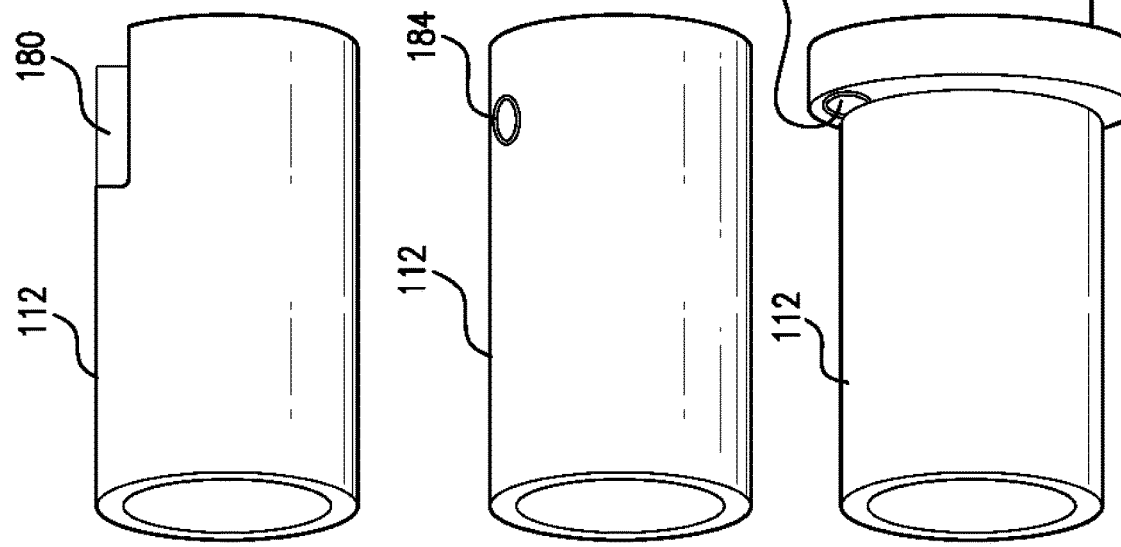
FIG. 15A
FIG. 15B
FIG. 15C

IRRADIATING TARGET MATERIAL LOCATED IN A SURROGATE FUEL BUNDLE IN A CANDU REACTOR FOR ISOTOPE PRODUCTION

CROSS-REFERENCE TO RELATED APPLICATIONS

This application is a Division of U.S. patent application Ser. No. 16/052,964 filed on Aug. 2, 2018, now U.S. Pat. No. 11,342,086, which claims priority to U.S. Provisional Patent Application No. 62/540,444, filed Aug. 2, 2017, the entire disclosures of which are incorporated by reference herein.

TECHNICAL FIELD

The presently disclosed invention relates generally to systems for irradiating radioisotope targets in nuclear reactors and, more specifically, to systems for irradiating radioisotope targets in heavy water-moderated fission-type nuclear reactors.

BACKGROUND

Technetium-99m (Tc-99m) is the most commonly used radioisotope in nuclear medicine (e.g., medical diagnostic imaging). Tc-99m (m is metastable) is typically injected into a patient and, when used with certain equipment, is used to image the patient's internal organs. However, Tc-99m has a half-life of only six (6) hours. As such, readily available sources of Tc-99m are of particular interest and/or need in at least the nuclear medicine field.

Given the short half-life of Tc-99m, Tc-99m is typically obtained at the location and/or time of need (e.g., at a pharmacy, hospital, etc.) via a Mo-99/Tc-99m generator. Mo-99/Tc-99m generators are devices used to extract the metastable isotope of technetium (i.e., Tc-99m) from a source of decaying molybdenum-99 (Mo-99) by passing saline through the Mo-99 material. Mo-99 is unstable and decays with a 66-hour half-life to Tc-99m. Mo-99 is typically produced in a high-flux nuclear reactor from the irradiation of highly enriched uranium targets (93% Uranium-235) and shipped to Mo-99/Tc-99m generator manufacturing sites after subsequent processing steps to reduce the Mo-99 to a usable form, such as titanium-molybdate-99 (Ti—Mo99). Mo-99/Tc-99m generators are then distributed from these centralized locations to hospitals and pharmacies throughout the country. Since Mo-99 has a short half-life and the number of existing production sites are limited, it is desirable both to minimize the amount of time needed to reduce the irradiated Mo-99 material to a useable form and to increase the number of sites at which the irradiation process can occur.

There at least remains a need, therefore, for a system and a process for producing a titanium-molybdate-99 material suitable for use in Tc-99m generators in a timely manner.

SUMMARY OF THE INVENTION

One embodiment of the present disclosure provides a method of irradiating a target material in a heavy water reactor for the production of an isotope, including the steps of providing a target comprised of a material suitable for producing the isotope by way of a neutron capture event, placing the target in a primary fluid side of the heavy water reactor, and irradiating the target.

Another embodiment of the present disclosure provides a fuel bundle surrogate for the irradiation of a target material in a heavy water reactor for the production of an isotope, the fuel bundle surrogate including a plurality of tube sheaths, each tube sheath being parallel to a longitudinal center axis of the fuel bundle surrogate, a plurality of end caps, each end cap being disposed on a corresponding end of a tube sheath, a pair of end plates, wherein the end plates are disposed at opposing ends of the plurality of tube sheaths, and a first target comprised of a first target material suitable for producing the isotope by way of a neutron capture event, wherein the first target is disposed in a first tube sheath of the surrogate fuel bundle.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

The invention now will be described more fully hereinafter with reference to the accompanying drawings, in which some, but not all, embodiments of the invention are shown. Indeed, this invention may be embodied in many different forms and should not be construed as limited to the embodiments set forth herein; rather, these embodiments are provided so that this disclosure will satisfy applicable legal requirements.

FIGS. 4A through 4J are schematic views of a radioisotope target irradiation process in accordance with an embodiments of the present invention;

FIGS. 5A through 5I are schematic views of a radioisotope irradiation process in accordance with an alternate embodiment of the present invention;

FIGS. 15A through 15C are exploded, partial perspective views of tube sheaths and their corresponding end caps for use with modular fuel bundle surrogates in accordance with embodiments of the present invention.

DESCRIPTION OF THE PREFERRED EMBODIMENTS

Reference will now be made to presently preferred embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 1A:
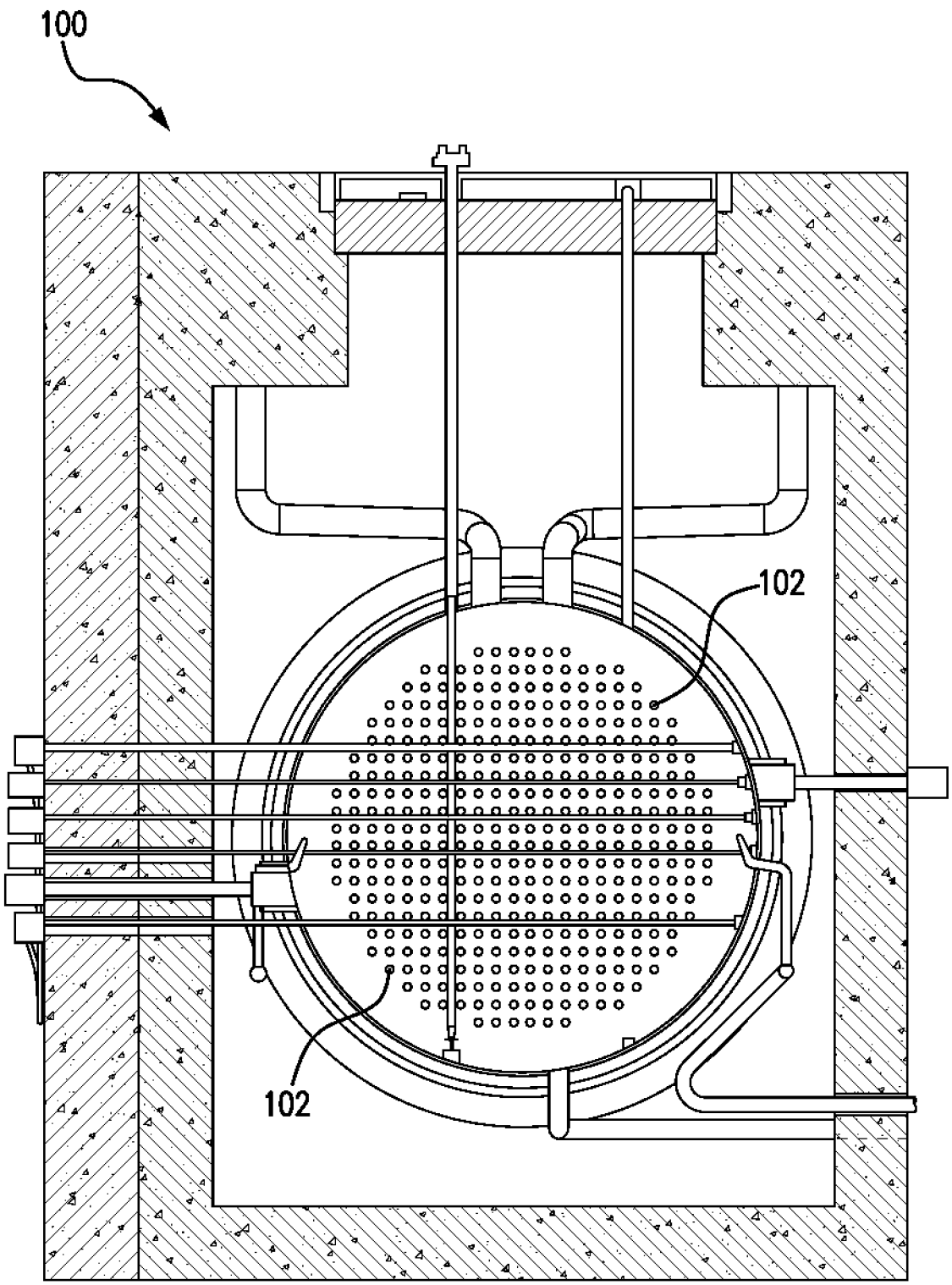
FIGS. 1A through 1C are various views of a heavy water moderated fission reactor and corresponding vessel penetrations.
Figure 1B:
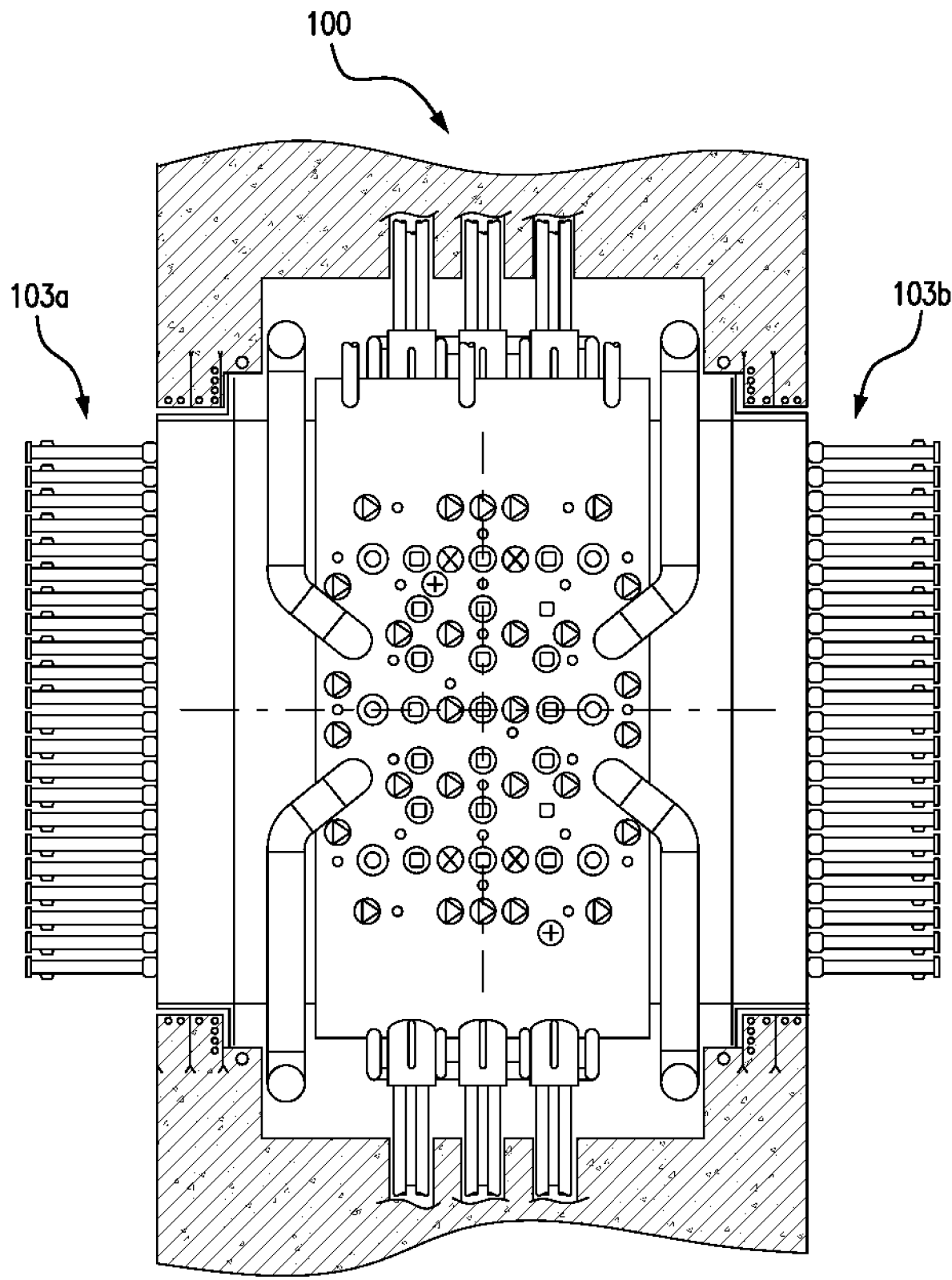
Figure 1C:
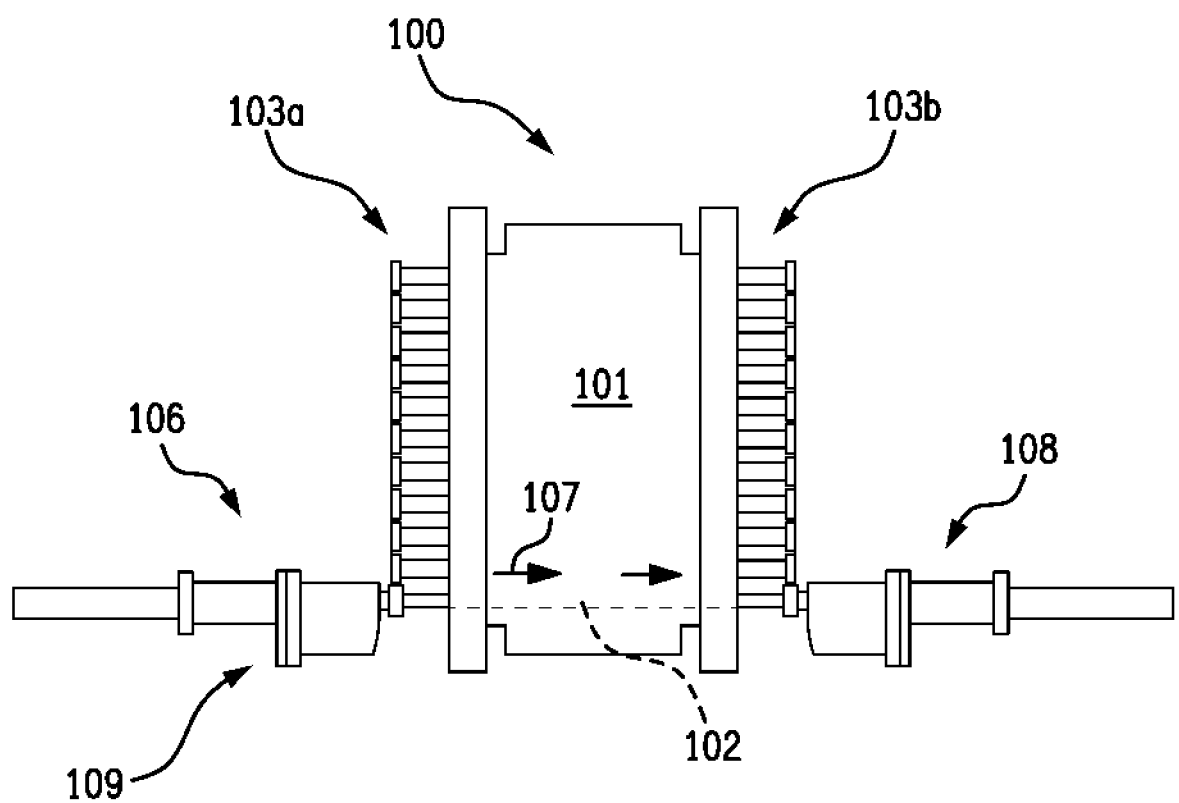
Figures 2A, 2B:
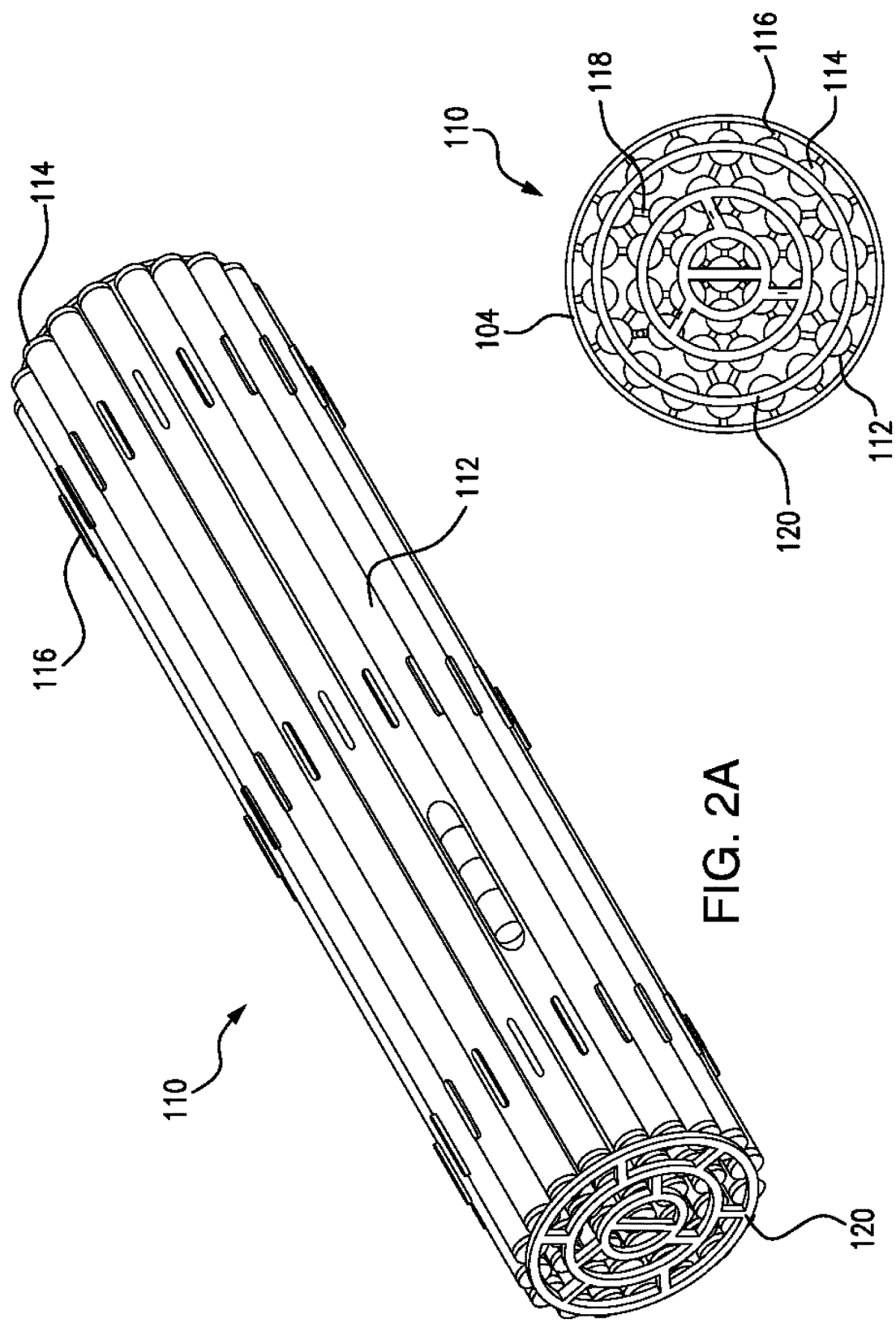
FIGS. 2A and 2B are a perspective view and an end view, respectively, of a fuel bundle surrogate in accordance with an embodiments of the present invention.

Referring now to the figures, the present disclosure relates to devices and methods for irradiating radioisotope targets for the production of radioisotopes as used in nuclear medicine. More specifically, referring now to the figures, the irradiation of the radioisotope targets 122 (FIGS. 3A and 3B) preferably occurs within a fuel channel 102 of a corresponding heavy water moderated nuclear fission reactor 100 (such as a CANDU (CANada Deuterium Uranium) reactor shown in FIGS. 1A through 1C). Preferably, the materials to be irradiated, such as Mo-98, are contained in a fuel bundle surrogate 110, as shown in FIGS. 2A and 2B. Of note, the present method of irradiating materials is of particular interest for those materials that have extended irradiation periods, such as Lutetium-177. For the present embodiment, the fuel bundle surrogate 110 differs primarily from a traditional fuel bundle that includes fissile material in that the fissile material is replaced by the radioisotope material that is to be irradiated. As such, the fuel bundle surrogate 110 includes a plurality of tube sheaths 112 that extend between a pair of opposing end plates 120. The end of each tube sheath 112 is enclosed by an end cap 114 which is welded to a corresponding end plate 120. The fuel bundle surrogate 110 is constructed using the same materials, such as zirconium, and methodologies that are currently used to construct the fissile fuel bundles 121. As these methods and materials are well known, they are not addressed in greater detail here in the interest of brevity.

Figure 3A:
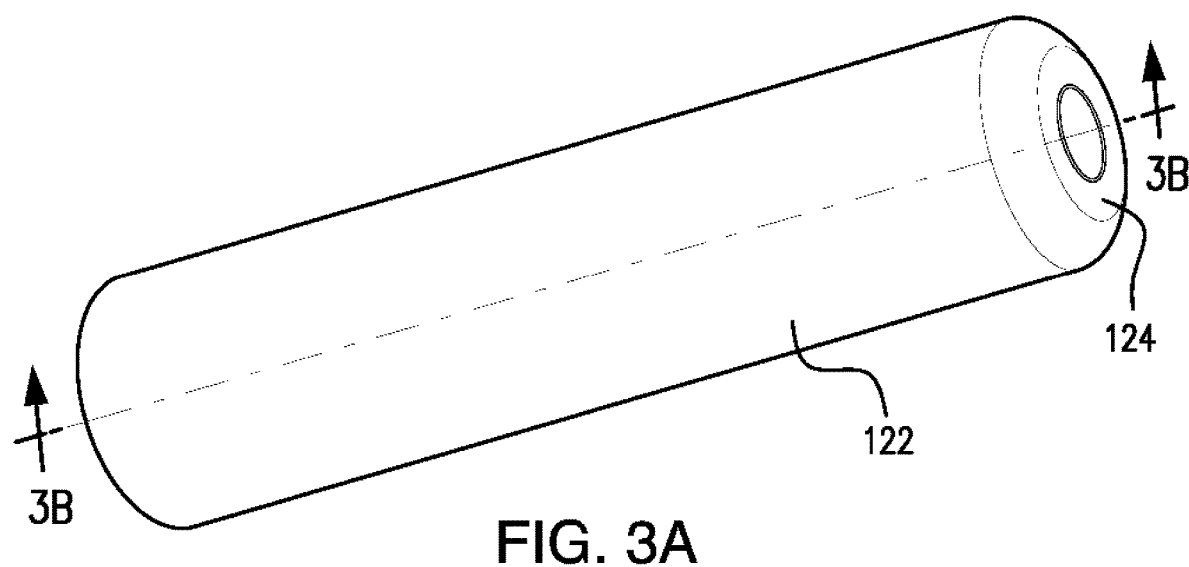
FIGS. 3A and 3B are a perspective view and a cross-sectional view, respectively, of a radioisotope target in accordance with an embodiment of the present invention.
Figure 3B:
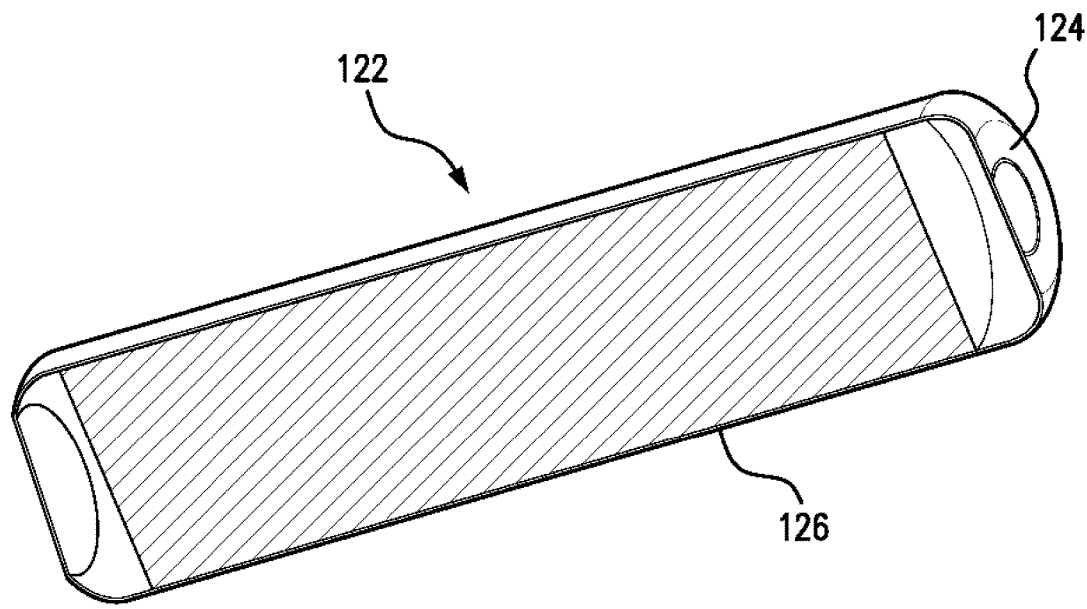

Referring now to FIGS. 3A and 3B, the radioisotope target material that is inserted into the corresponding tube sheaths 112 of the fuel bundle surrogate 110 is provided in the form of individual targets 122. Each target includes an enclosed outer capsule 124 in which target material 126 is disposed. Preferably, the outer capsule 124 is also constructed of the target material and the outer diameter of outer capsule 124 allows targets to be readily removed from the tubes sheaths 112 after irradiation by sliding action. Note, in alternate embodiments, the target material may be introduced into the tube sheaths 112 without use of an outer capsule, i.e., it is introduced directly into the interior of the tube sheaths. Moreover, the radioactive target material, which is preferably Mo-98, can be in the form of a powder, wafers, annular disks, pellet form, etc.

Each fuel bundle surrogate 110 is inserted into a pressure tube 104 (FIG. 4A) of a corresponding fuel channel 102 on the primary fluid side of the reactor 100 with an existing fueling machine 106 of the reactor 100. As shown in FIG. 1C, the fueling machine 106 includes a charge machine 109 and an accept machine 108, each of which is configured to interact with a corresponding set of fuel channel end fittings 103a and 103b, respectively, that are disposed on opposing ends of the plurality of pressure tubes 104. As shown in FIG. 1C, charge machine 109 is disposed on the "upstream" side of the reactor core 101 (meaning primary coolant flows through reactor core 101 from left to right as shown in FIG. 1C) and accesses each pressure tube 104 by way of a corresponding fuel channel end fitting 103a, whereas accept machine 108 is disposed on the "downstream" side of reactor core 101 and accesses the desired pressure tube 104 through the corresponding fuel channel end fitting 103b. Each fuel bundle surrogate 110 is inserted into, and arranged within, the corresponding fuel channel 102 along with other fuel bundle surrogates 110, fissile fuel bundles, and non-fissile placeholders 133 (FIG. 4A) by the existing fueling machine 106 of the reactor 100.

After an appropriate residency time in the flux field of the reactor core 101 for the material being irradiated, each fuel bundle surrogate 110 is removed from its corresponding fuel channel 102 utilizing accept machine 108 and charge machine 109, as discussed in greater detail below. The post-irradiation fuel bundle surrogates 110 are carried to an approved exit location, existing fuel handling port (e.g., spent fuel, ancillary, maintenance) or purpose-built device, such as a trolley mounted shielded flask 130 (shown in FIGS. 6A through 6G). The shielded flask 130 allows for multiple paths to be used when transferring the irradiated fuel bundle surrogates 110 from the fuel handling equipment (i.e. fueling machine 106) to laboratories and/or processing facilities that are on-site of the reactor complex. Utilization of existing fuel handling systems (e.g., fueling machine 106, trolleys, conveyors, new and irradiated fuel ports, etc.) allows for expedited on-line harvesting of the irradiated fuel bundle surrogates 110 during full power operations of the reactor 100. Moreover, in that preferred fuel bundle surrogates 110 are constructed similarly to present fissile fuel bundles and are handled utilizing existing fuel handling equipment, notably accept machine 108 and charge machine 109, methodologies of manipulating the fuel bundle surrogates 110 are time-tested.

Referring now to FIGS. 4A through 4J, in accordance with one example method for irradiating radioisotope targets disposed in a fuel bundle surrogate 110a, accept machine 108 of the reactor's fuel handling equipment is loaded with a first "half-string" of non-fissile bundles 133a, as shown in FIG. 4A. As shown in FIG. 4B, the first half-string of non-fissile bundles 133a is inserted into the pressure tube 104 of a dedicated fuel channel 102 of the reactor core 101 in a "fuel against flow" manner. The term "fuel against flow" means the bundles are urged into the pressure tube 104 of the reactor core 101 in the opposite direction of the flow of the primary coolant, the primary coolant in the present example flowing from left to right as indicated by arrows 107. The accept machine 108 and charge machine 109 access the desired fuel channel 102 by way of the corresponding fuel channel end fittings 103*b* and 103*a*.

As shown in FIG. 4C, the accept machine 108 is loaded with the fuel bundle surrogate 110*a*, which includes a plurality of unirradiated Mo-98 targets 122 (FIG. 3A), and an additional second half-string of non-fissile bundles 133*b*. The non-fissile bundles 3 *a* and 133 *b* help position the fuel bundle surrogate 110*a* in the desired location within the fuel channel 102 and, therefore, the reactor core 101. The desired location within the fuel channel 102 is primarily dependent on the strength of the flux field within the reactor core 101. As well, the non-fissile bundles help maintain even flow of the primary fluid through the corresponding pressure tube 104. Next, the fuel bundle surrogate 110*a* is inserted into the pressure tube 104 in the "fuel against flow" manner, as shown in FIG. 4D, followed by the insertion of the second half-string of non-fissile bundles 133*b* in the "fuel against flow" manner, as shown in FIG. 4E.

After the fuel bundle surrogate 110*a* is irradiated in the flux field of the reactor core 101 for an appropriate period of time, which is determined based on the type of radioisotope material being utilized (for example, seven days for Mo-98), as shown in FIG. 4F, the accept machine 108 is loaded with the next fuel bundle surrogate 110*b* to be irradiated, as shown in FIG. 4G.

As shown in FIG. 4H, the second half-string of non-fissile bundles 133*b* is unloaded in the "fuel with flow" manner, meaning the non-fissile bundles exit the pressure tube 104 in the same direction as the flow 107 of the primary fluid, followed by the irradiated surrogate fuel bundle 110*a*.

As shown in FIG. 4I, the new unirradiated fuel bundle surrogate 110*b* is inserted using the "fuel against flow" method, which is followed by the second half-string of non-fissile bundles 133*b* being inserted into the pressure tube 104 of the fuel channel 102 in the "fuel against flow" manner, as shown in FIG. 4J. As previously noted, the non-fissile bundles 133*a* and 133*b* assist in positioning the fuel bundle surrogates 110*a* and 110*b* in the desired locations and, as well, they help to maintain proper flow distribution of the primary fluid through the pressure tubes 104. The method described above can be repeated on a continuous basis during full-power operation of the reactor 100. Note, as described above, only one fuel bundle surrogate 110 is being irradiated in the reactor core 101 at any given time. In alternate methods, the number of fuel bundle surrogates 110 being actively irradiated can vary as desired based on the desired schedule of harvesting the irradiated radioisotope targets. Where it is desirable to yield fewer targets than contained in a fully-loaded fuel bundle surrogate, filler materials may be utilized in place of a portion of the radioisotope targets.

Figure 5C:
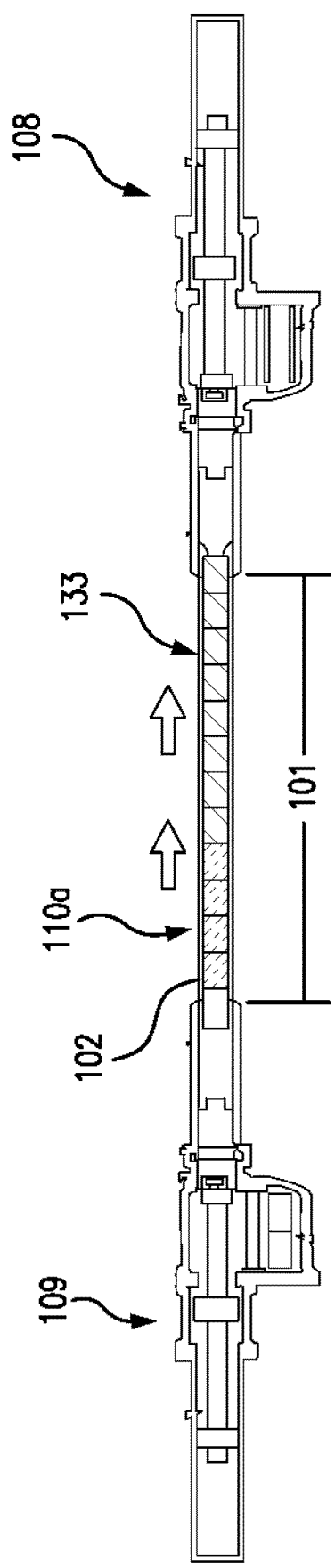

Referring now to FIGS. 5A through 5I, another example method of irradiating radioisotope targets in fuel bundle surrogates 110 is a "continuous use" method utilizing a dedicated fuel channel 104 of the reactor core 101. Referring now to FIG. 5A, the accept machine 108 of the reactor fuel loading equipment 106 is first loaded with a first set of four surrogate fuel bundles 110*a*, which preferably include Mo-98 targets. As well, the accept machine 108 is loaded with eight non-fissile bundles 133. As in the previously discussed method, the non-fissile bundles 133 assist in both positioning the surrogate fuel bundles in the desired location and maintaining proper flow distribution of the primary fluid through the pressure tubes 104 of the reactor core 101. The accept machine 108 and charge machine 109 access the desired fuel channel 102 by way of the corresponding fuel channel end fittings 103*b* and 103*a*.

As shown in FIG. 5B, the first four fuel bundle surrogates 110*a* are loaded in the "fuel against flow" manner, which is then followed by inserting the eight non-fissile bundles 133 into the pressure tube 104 of the fuel channel 102 also using the "fuel against flow" method, as shown in FIG. 5C.

Figure 5D:
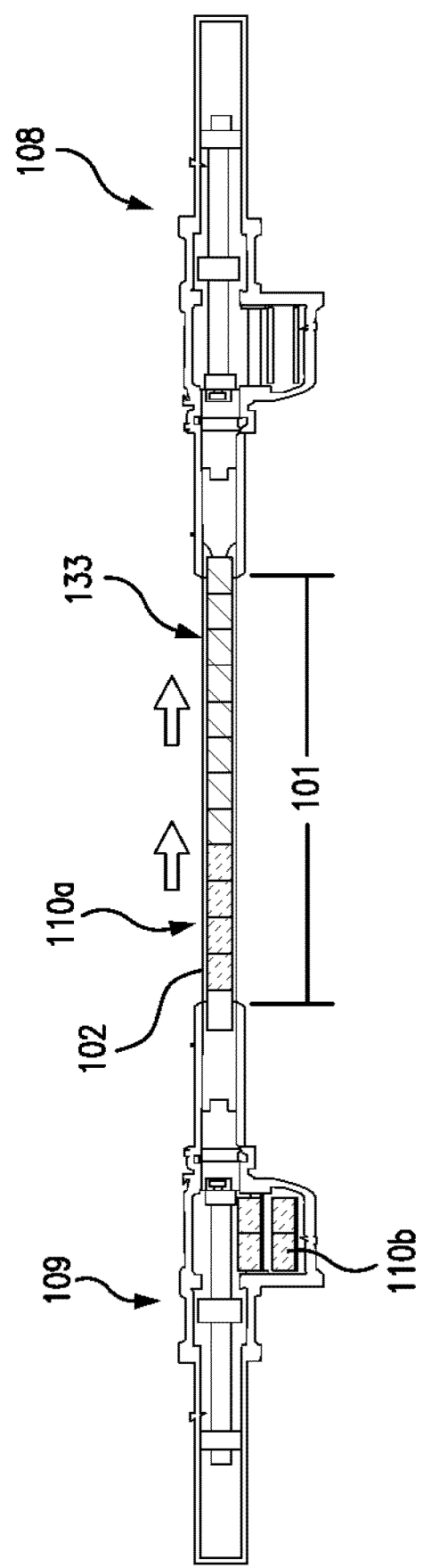

Referring to FIG. 5D, the charge machine 109 is then loaded with a second set of four additional surrogate fuel bundles 110*b* that also include a plurality of unirradiated Mo-98 targets. As shown in FIG. 5D, as the charge machine 109 inserts the second set of fuel bundle surrogates 110*b* into the pressure tube 104 in the "fuel with flow" manner, the accept machine 108 removes four of the non-fissile bundles 133 in the "fuel with flow" manner (FIG. 5E).

As shown in FIG. 5F, the charge machine 109 is next loaded with a third set of four additional fuel bundle surrogates 110*c* which are then inserted by the charge machine 109 into the pressure tube 104 in the "fuel with flow manner." As the third set of four fuel bundle surrogates 110*c* are being inserted, the accept machine 108 removes the remaining non-fissile bundles 133, as shown in FIG. 5G.

Figure 5I:
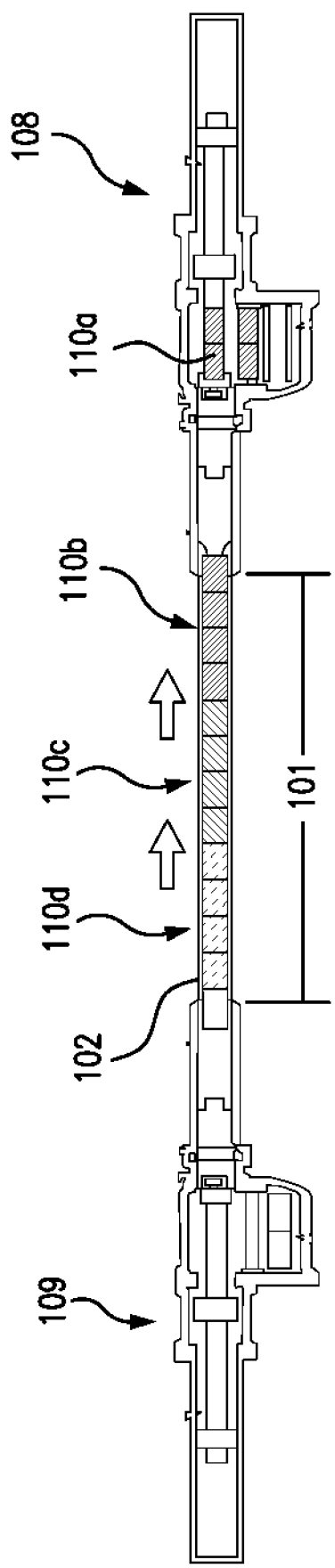

As shown in FIG. 5H, each bundle within the pressure tube 104 is now a fuel bundle surrogate 110*a*, 110*b*, and 110*c* including irradiated Mo-98 targets. Also as shown in FIG. 5H, the charge machine 109 is next loaded with a fourth set of four new fuel bundle surrogates 110*d* that include unirradiated Mo-99 targets. As shown in FIG. 5I, as the fourth set of unirradiated fuel bundle surrogates 110*d* is inserted in the pressure tube 104 in "fuel with flow" manner, the accept machine 108 removes the first set of four fuel bundle surrogates 110*a* that have been irradiated for the desired time (that being approximately 7 days for Mo-98). As shown in FIG. 5H and FIG. 5I, new fuel bundle surrogates may be loaded by the charge machine 109 when it becomes time to remove the fuel bundle surrogates that have been irradiated for the desired amount of time, leading to the continuous nature of this method. Note, in alternate methods, fewer or more than four fuel bundle surrogates may be included in each set.

Another example method of irradiating radioisotope targets includes "reshuffling" an existing string of fissile fuel bundles within a corresponding fuel channel. A fuel string is reshuffled by removing a fissile fuel bundle and replacing it with an unirradiated fuel bundle surrogate. The position of the fuel bundle surrogate within the fuel channel may be varied by removing a given number of fissile fuel bundles, inserting the fuel bundle surrogate, and then replacing all of the previously removed fissile fuel bundles with the exception of the last one. As well, multiple fuel bundle surrogates may be inserted into the fuel channel as long as a corresponding number of the removed fissile fuel bundles are not re-inserted into the fuel channel. To remove the surrogate fuel bundles after an appropriate irradiation period, the fueling machine reshuffles the string at the output end (accept machine 108, FIG. 1C), and inserts an equal number of new fissile fuel bundles at the input end (charge machine 109, FIG. 1C). To optimize this method, the extraction of the irradiated fuel bundle surrogates preferably occurs at the same time plant operators would normally anticipate a routine fueling operation to provide new fissile fuel bundles to the fuel channel.

The radioisotope material irradiation methods discussed above offer various advantages that may not be present in existing irradiation methodologies, such as when irradiation ports of research reactors are utilized for target irradiation. Most notably, methods of irradiation that include the utilization of fuel bundle surrogates, such as those discussed above, offer the ability to increase the amount of a given radioisotope that may be produced over a given amount of time. For example, the full volume of a fuel bundle surrogate 110 (FIGS. 2A and 2B) can be utilized to yield large quantities of irradiated material relative to existing methods of irradiating radioisotope targets (i.e., using research reactors). As well, multiple fuel bundle surrogates 110 can be irradiated simultaneously in a single fuel channel of a CANDU reactor, for example, up to 13 fuel bundle surrogates 110 at a time. Moreover, multiple fuel channels within a given CANDU reactor may be utilized simultaneously.

In addition to increasing yields of radioisotopes over existing irradiation methods, more than one radioisotope target material can be loaded into a single fuel bundle surrogate 110 for simultaneous irradiation. Similarly, different radioisotope target irradiation materials may be loaded into different fuel bundle surrogates 110 within a single string (fuel channel) of the reactor. Manipulation of these fuel bundle surrogates 110 by the fueling machine 106 (FIG. 1C) allows for the different fuel bundles surrogates 110 to be irradiated simultaneously, yet removed from the corresponding fuel channel independently of each other dependent upon the desired period of irradiation for the given target material. As well, any fuel channel within the reactor core maybe utilized for the irradiation of fuel bundle surrogates 110 provided an adequate level of flux is present at that fuel channel.

Referring now to FIGS. 6A through 6H, a system for moving irradiated fuel bundle surrogates 110 from the reactor to a desired receiving/processing area within the reactor complex includes a shielded containment flask 130 that is disposed on a movable trolley 131, and a conveyor 134 and extends between a receiving area 137 for the flask and a collection area 140 for the irradiated targets 122. As shown, the flask 130 is received on the trolley 131 so that the flask 130 can be moved between a location in which it is accessible by the accept machine 108 (FIG. 1C) and a location where the irradiated fuel bundle surrogates 110 may be safely removed from the flask 130, such as the flask receiving area 137.

After one or more fuel bundle surrogates 110 have been irradiated and removed from the reactor core 101 by the accept machine 108 (FIGS. 4A through 4J and 5A through 5I), the accept machine 108 is temporarily latched onto the corresponding port (not shown) on the flask 130, wherein each port is in communication with a corresponding storage location within the flask 130. In a preferred embodiment, each port on the flask 130 is constructed similarly to the previously discussed fuel channel end fittings 103a and 103b (FIG. 4A), thereby allowing the accept machine 108 to engage the flask 130 in the same manner it engages a fuel channel of the reactor core. Each storage location within the flask 130 is configured to accept one or more irradiated fuel bundle surrogates 110. Upon discharging one or more fuel bundle surrogates 110 in to the interior of flask 130, the accept machine 108 is undocked from the flask 130 and returned to routine operations as needed.

Figure 6A:
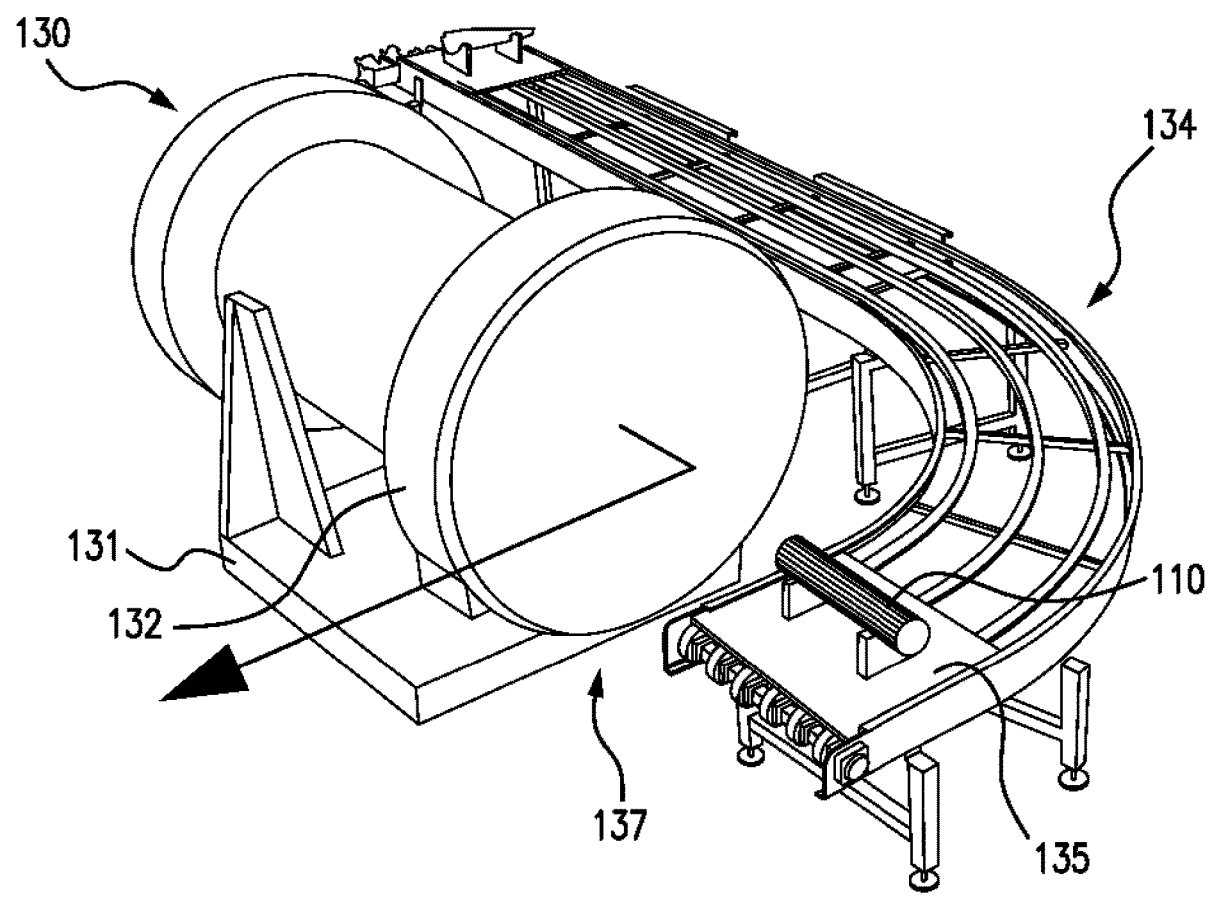
FIGS. 6A through 6G are perspective views of a transfer system for moving irradiated fuel bundle surrogates within a shielded flask, in accordance with an embodiment of the present invention.
Figure 6B:
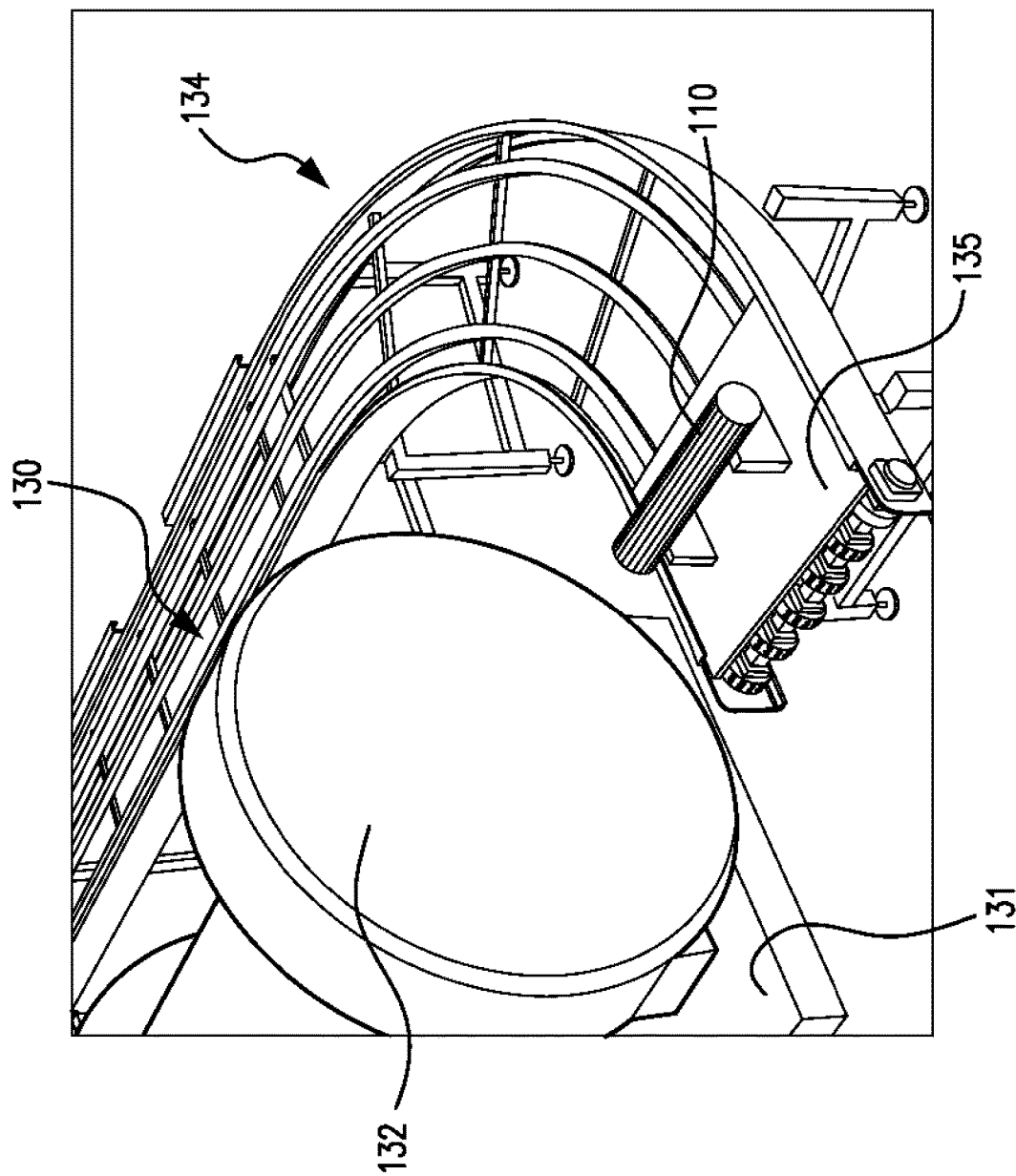
Figure 6C:
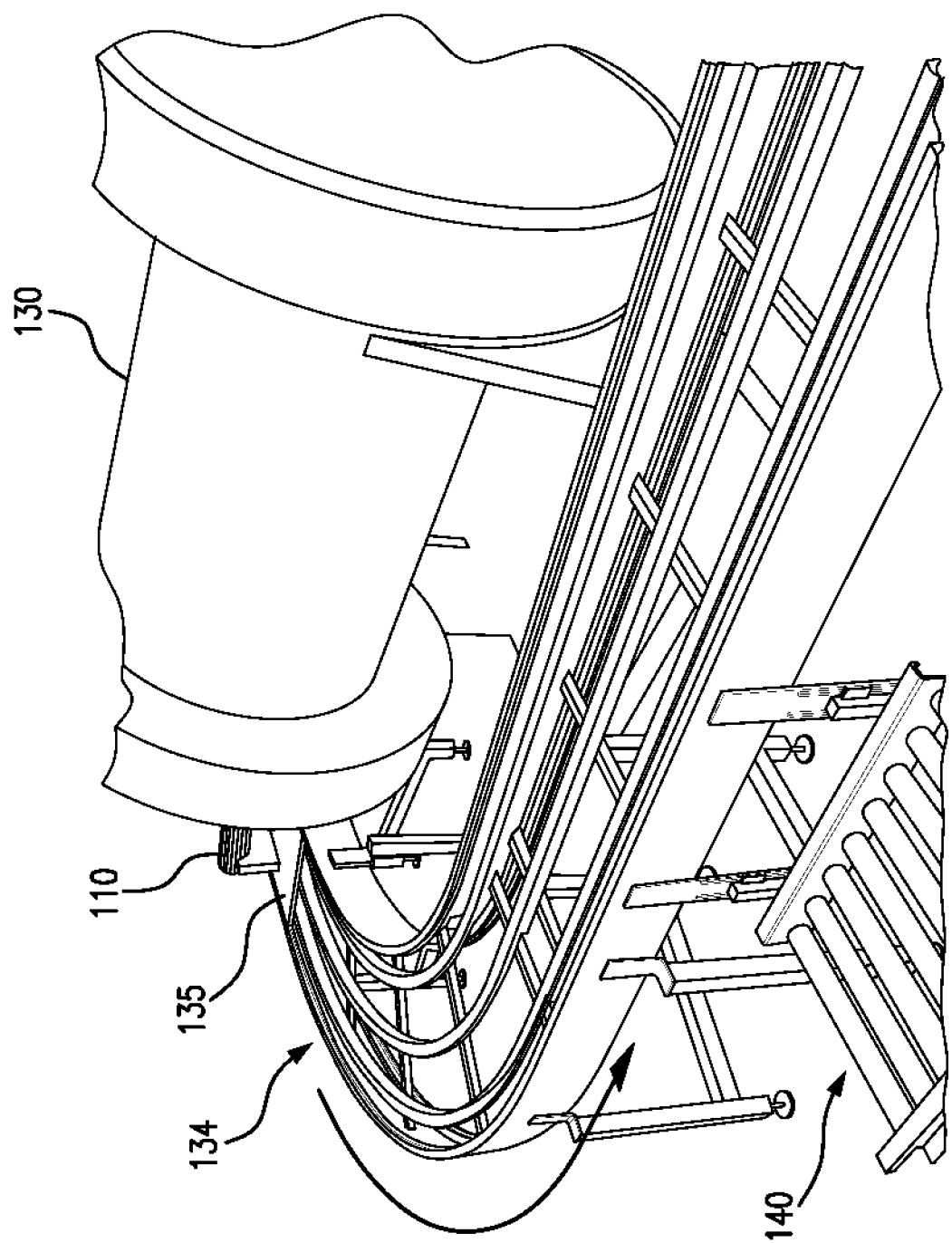
Figure 6D:
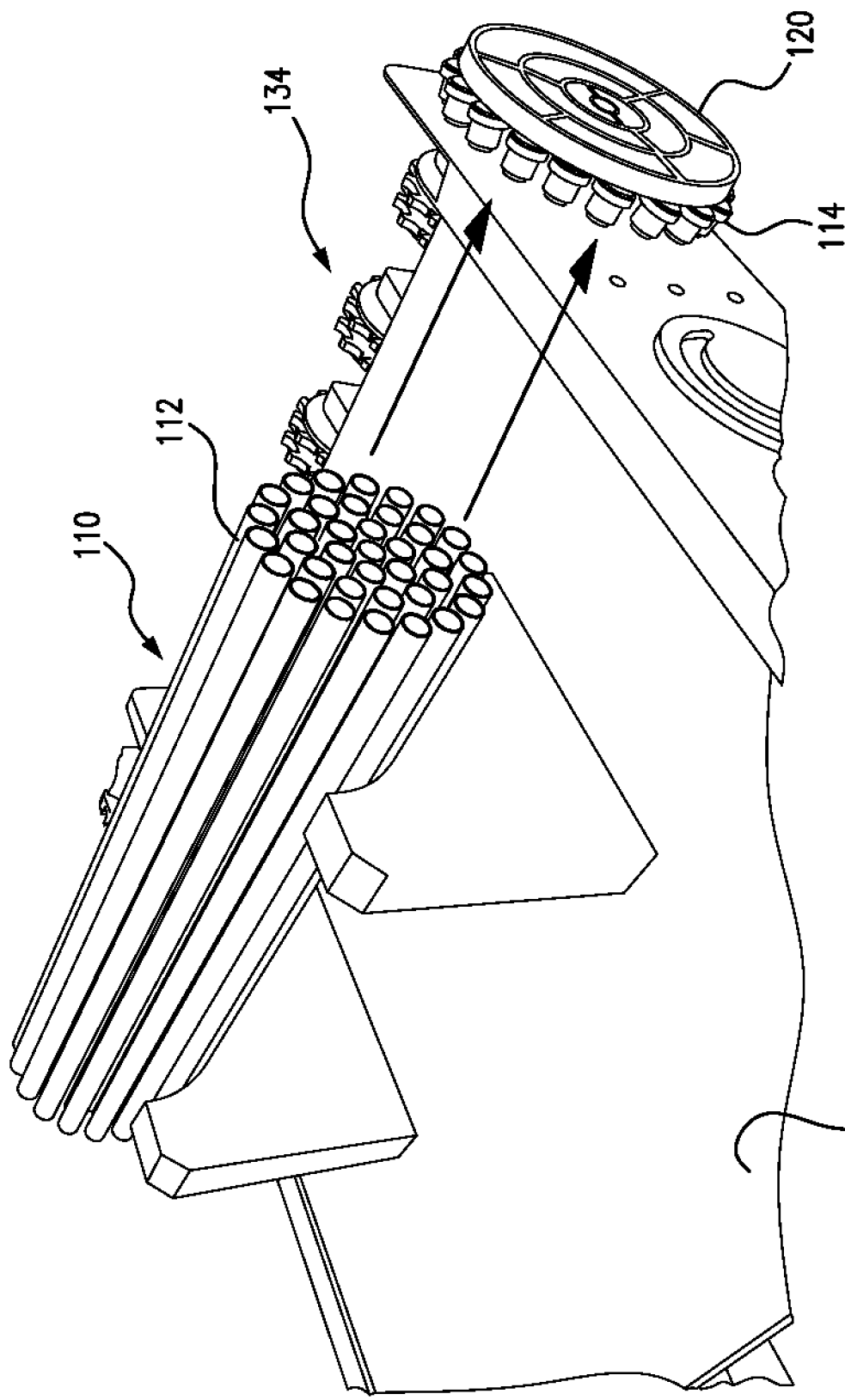

Preferably, flask 130 includes adequate shielding such that the irradiated fuel bundle surrogates 110 can be moved about the reactor complex as needed to the desired location. Referring specifically to FIG. 6A, once trolley 131 has conveyed flask 130 to the desired processing area, such as flask receiving area 137, an end door 132 of flask 130 is removed so that the irradiated fuel bundle surrogates 110 may be removed. Note, because the fuel bundle surrogates 110 disposed within flask 130 have been irradiated, the end door 132 of the flask 130 is only removed after necessary doors, interlocks, etc., have been secured to prevent inadvertent exposure to plant personnel. With containment established and the end door 132 removed, the surrogate fuel bundles 110 are removed from the flask 130 and transported on conveyor 134 to the target collection area 140, as shown in FIGS. 6B and 6C. Preferably, each storage location within the flask 130 includes a ram (not shown) configured to urge the irradiated fuel bundle surrogates 110 out of the flask 130. As best seen in FIG. 6D, each fuel bundle surrogate 110 is received on a corresponding cradle 135 so that it is supported above the conveyor 134 and its motion along conveyor 134 is facilitated.

Figure 6E:
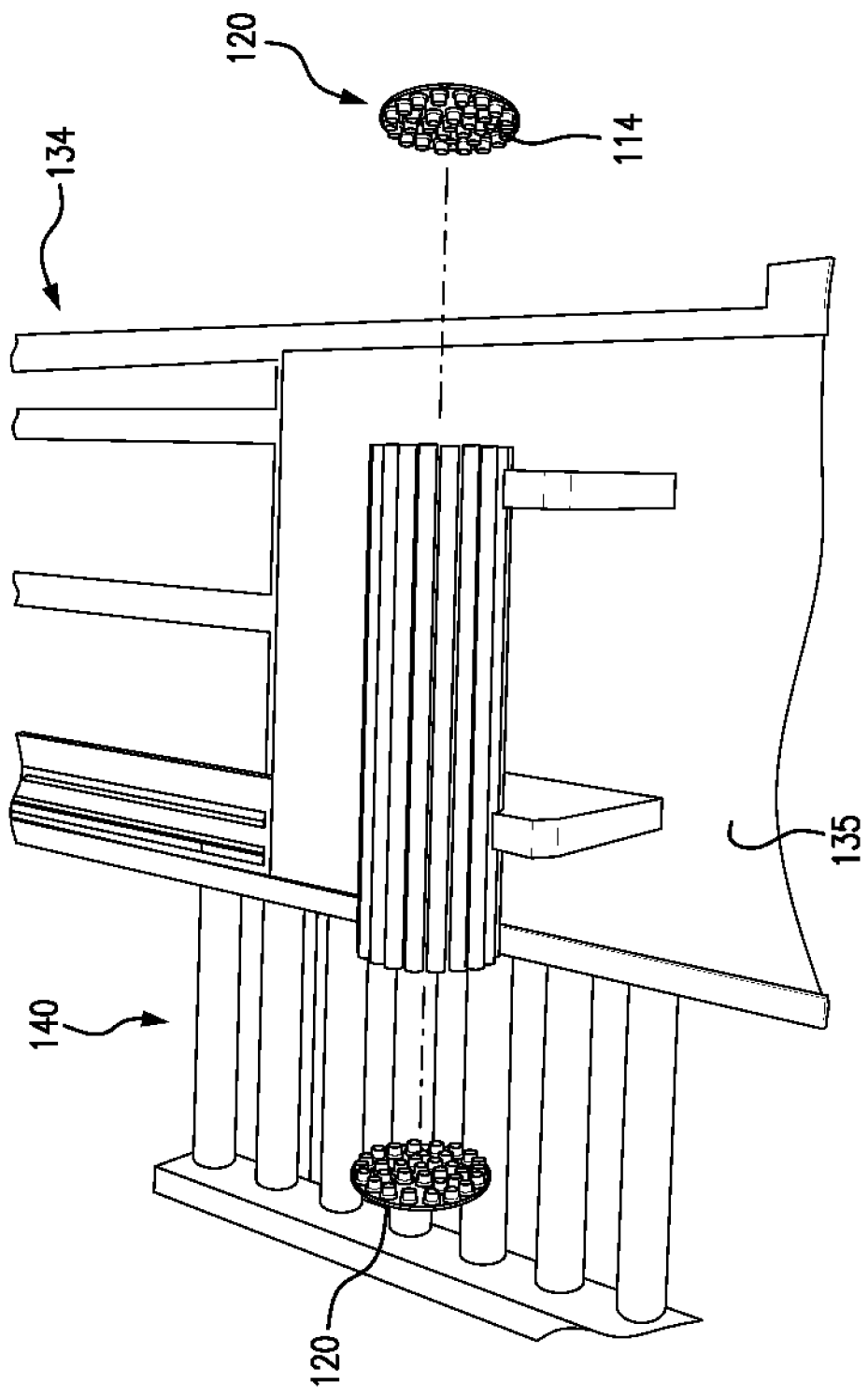
Figure 6F:
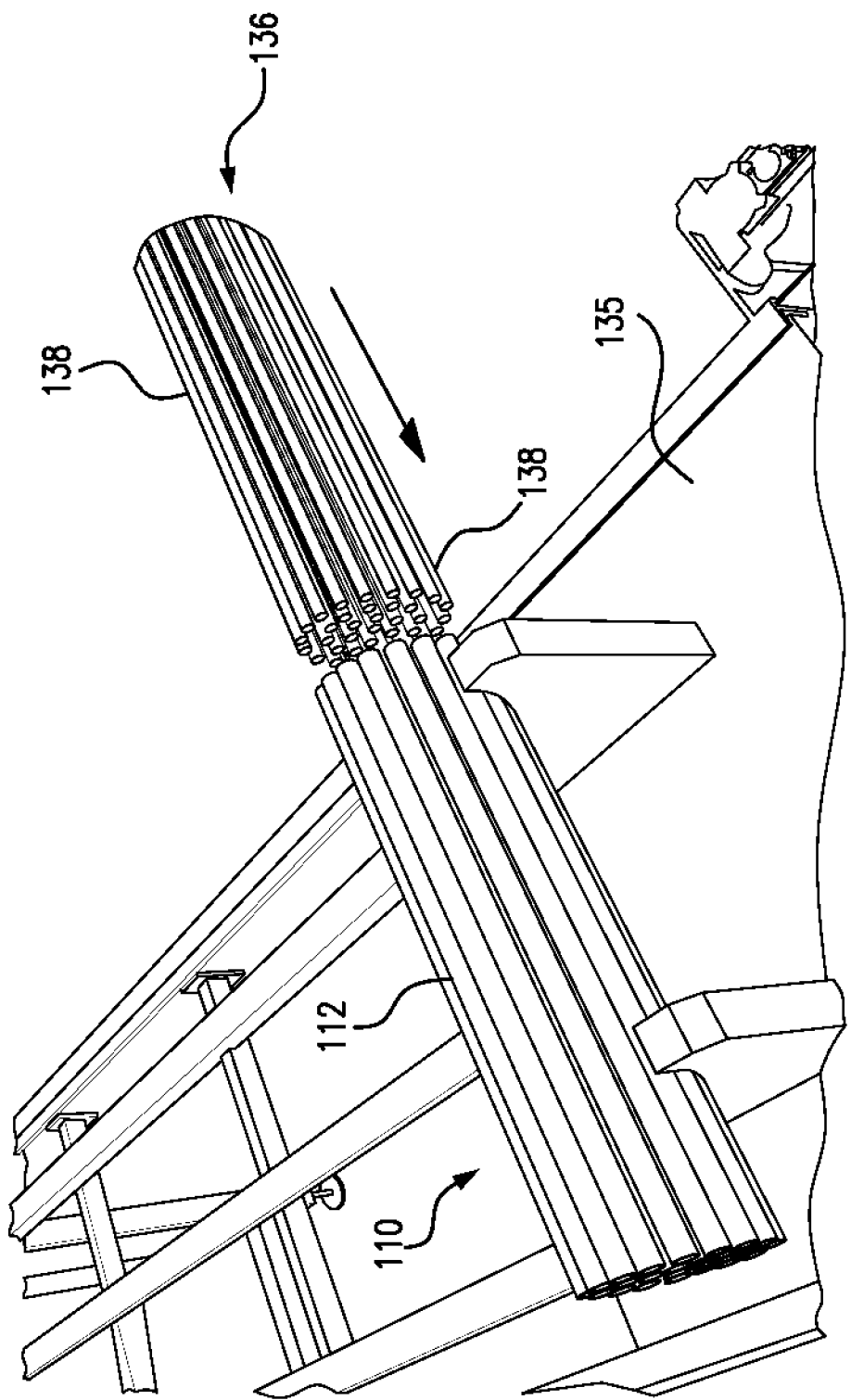
Figure 6G:
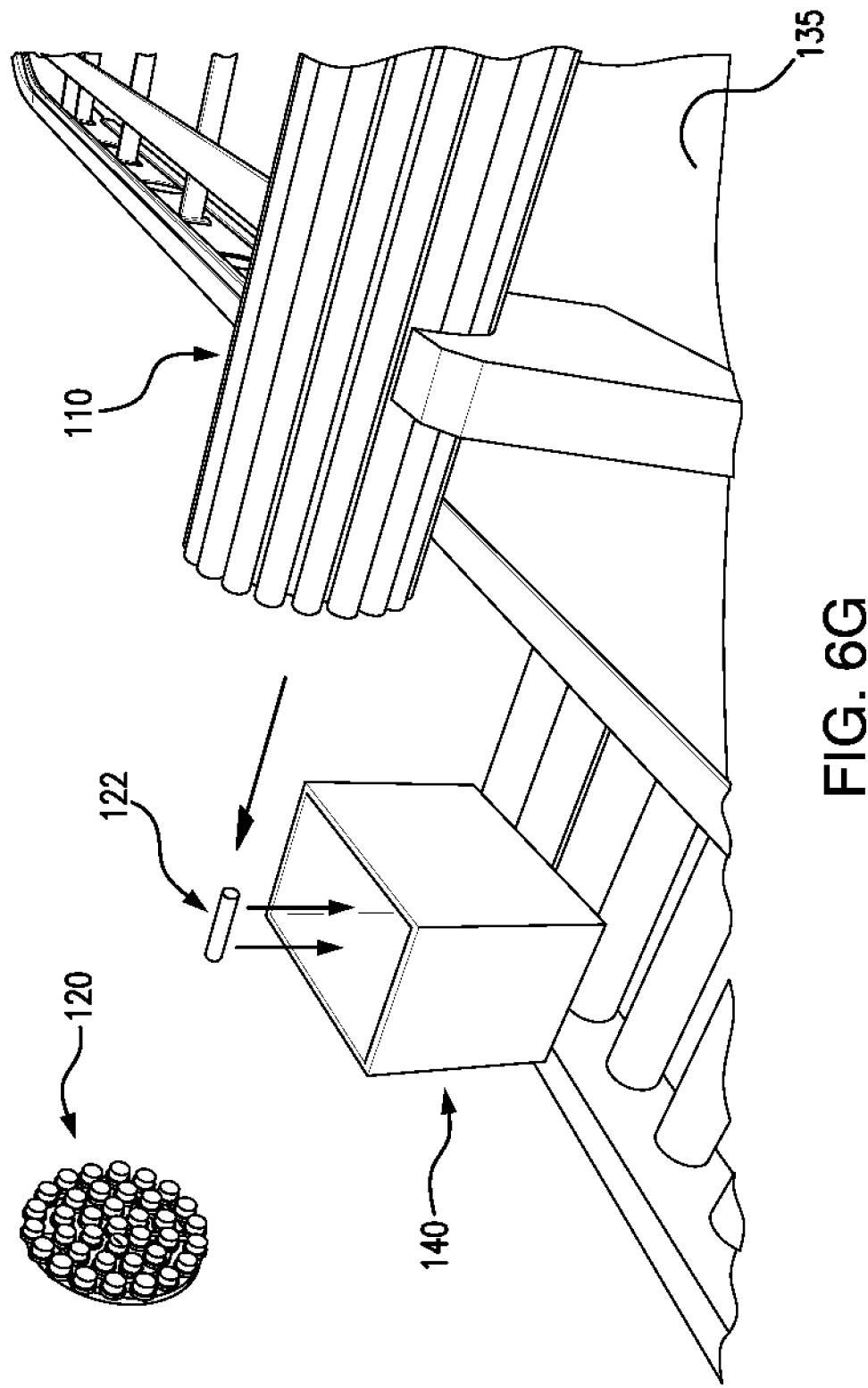

As shown in FIGS. 6D and 6E, once the surrogate fuel bundle 110 is received at the target collection area 140, the end plates 120 are removed from both ends of the fuel bundle surrogate 110. As shown, a fuel bundle surrogate 110 includes end caps 114 that are secured to the end plates 120 so that each tube sheath 112 is open at both ends once the end plates 120 have been removed from the fuel bundle surrogate. Referring now to FIGS. 6F and 6G, with both end plates 120 removed, a ramrod 136 is preferably used to push the irradiated Mo-98 targets out of the corresponding tube sheaths 112 and into the collection area 140. As best seen in FIG. 6F, the ramrod 136 includes a plurality of parallel arms 138, each arm 138 being positioned on the ramrod 136 so that it corresponds to a single tube sheath 112 of the fuel bundle surrogate 110. As such, the ramrod 136 is able to urge all of the targets 122 out of the fuel bundle surrogate 110 in a single pass. As shown, removal of the end plates 120 leaves the remainder of the fuel bundle surrogate 110 intact so that it may be readily reused in subsequent target irradiation processes.

As discussed above with regard to FIGS. 2A, and 2B, one embodiment of a fuel bundle surrogate 110 in accordance with the present disclosure is constructed using the known design, materials, and construction methods as existing fissile fuel bundles for CANDU reactors. Specifically, fuel bundle surrogate 110 includes tube sheaths 112, end caps 114, bearing pads 116, end plates 120, and spacer pads 118 that are constructed and assembled similarly to fissile fuel bundles, the primary difference being that fuel bundle surrogate 110 includes radioisotope targets 122 (FIGS. 3A and 3B) rather than fissile fuel pellets. As such, fuel bundle surrogate 110 affects the flow characteristics of the primary fluid within the corresponding fuel channel of the reactor core in the same manner as the fissile fuel bundles. As well, as would be expected, the effects of the primary flow and radiation on fuel bundle surrogate 110 are similar to their effects on fissile fuel bundles 121.

Figure 7A:
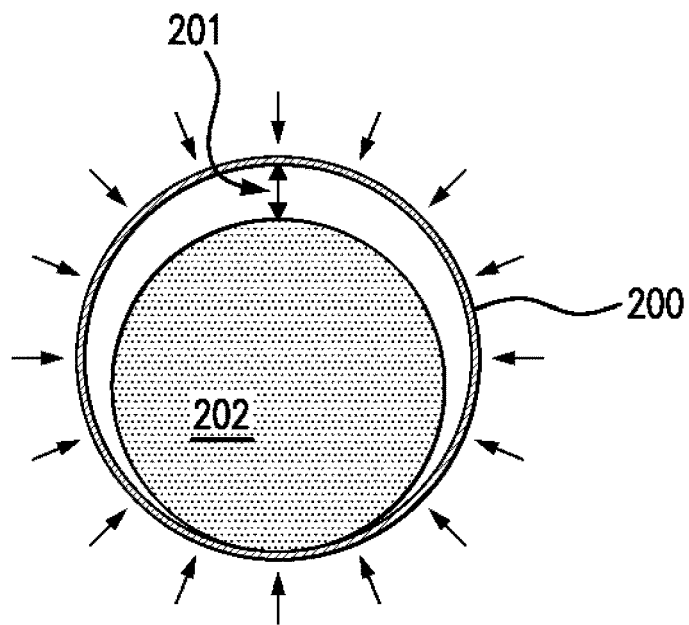
FIGS. 7A and 7B are cross-sectional views of a prior art tube sheath and associated fuel pellets as found in known fissile fuel bundles.
Figure 7B:
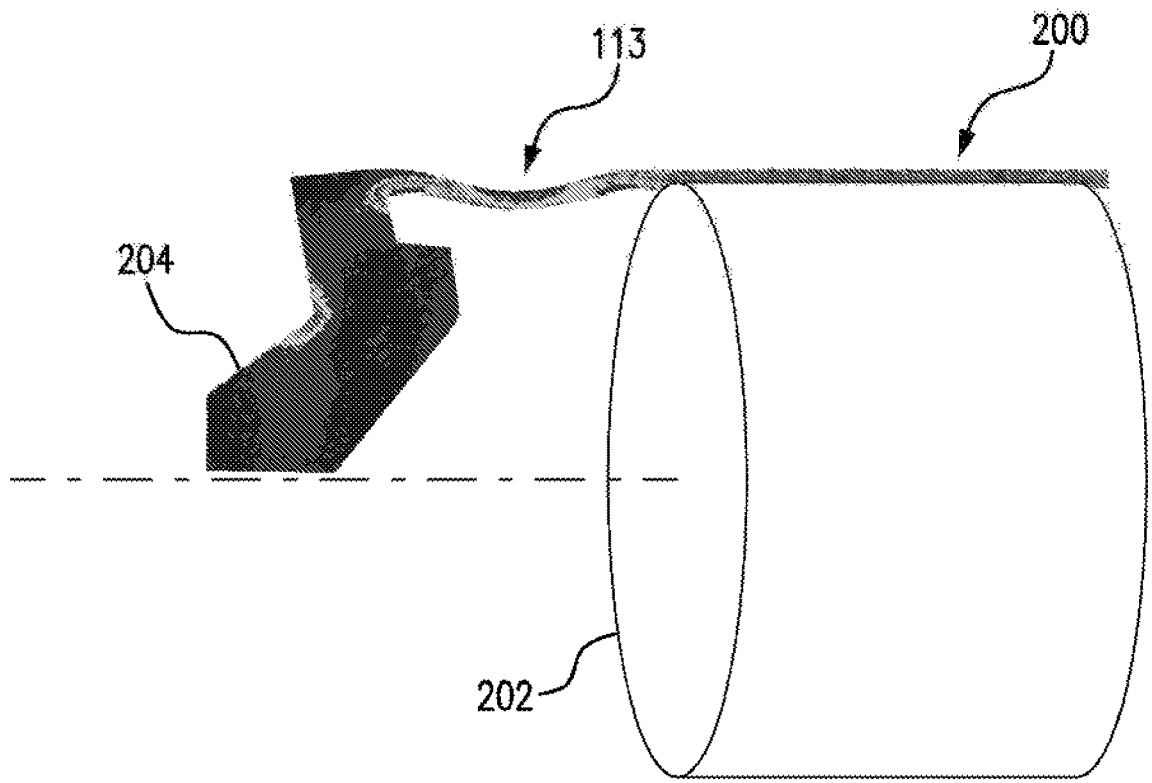

Referring to FIGS. 7A and 7B, tube sheaths 200 of fissile fuel bundles are designed to undergo sheath collapse in which a large portion of the sheath wall "collapses" onto the fuel pellets 202 that are disposed therein. Whereas sheath collapse is desirable in fissile fuel bundles because it reduces the gap 201 that exists between the inner surface of tube sheath 200 and the fuel pellets 202, thereby increasing thermal conductivity, it can be a disadvantage when removing irradiated radioisotope targets from a tube sheath of the fuel bundle surrogate. As shown in FIG. 7B, sheath collapse can lead to sag deformation regions 113 that form at the axial ends of the tube sheath 200 adjacent to the end caps 204. The reduced diameter of the tube sheath 200 that occurs in the vicinity of the sag deformation regions 113 can hamper removal of the irradiated radioisotope targets 122 from the corresponding tube sheath 200 in that the targets have a greater outer diameter than the inner diameter of the radiated tube sheath 200.

Figure 8A:
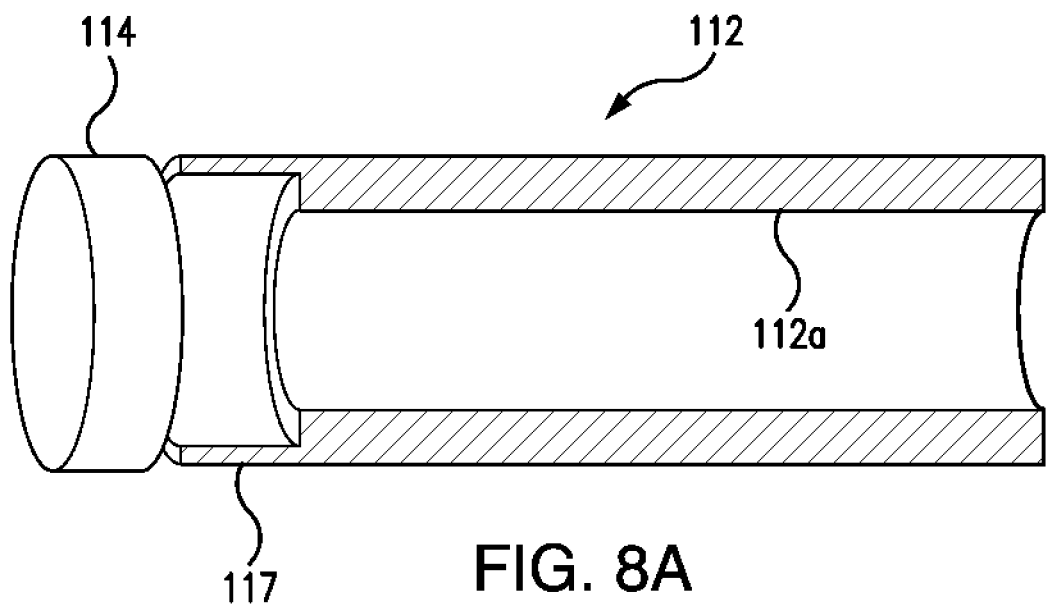
FIGS. 8A and 8B are partial cross-sectional views of tube sheaths and their corresponding end caps, in accordance with an embodiment of the present invention.
Figure 8B:
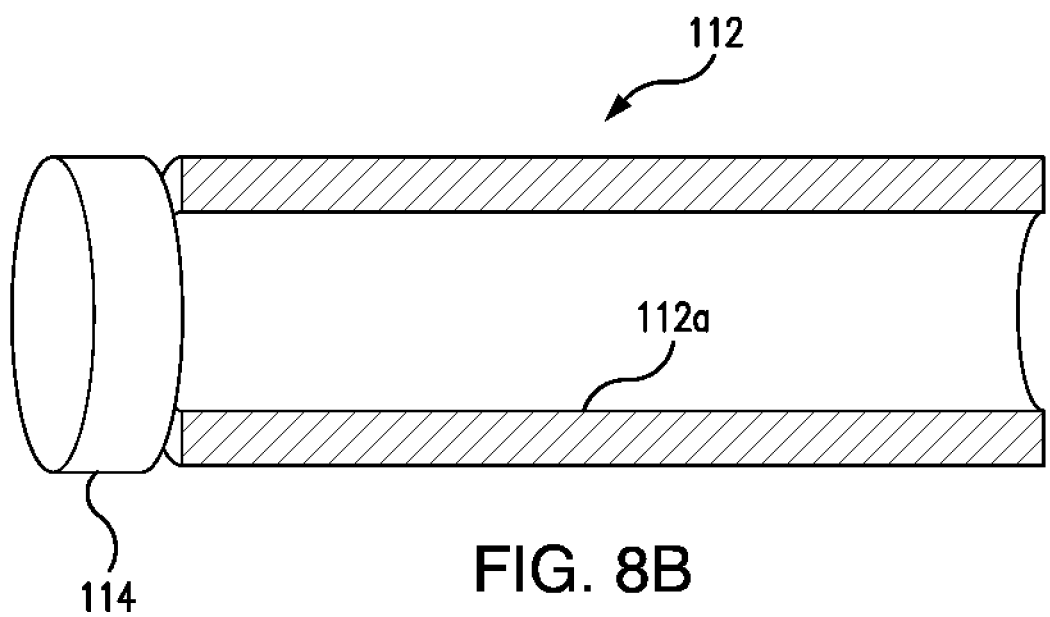
Figure 9A:
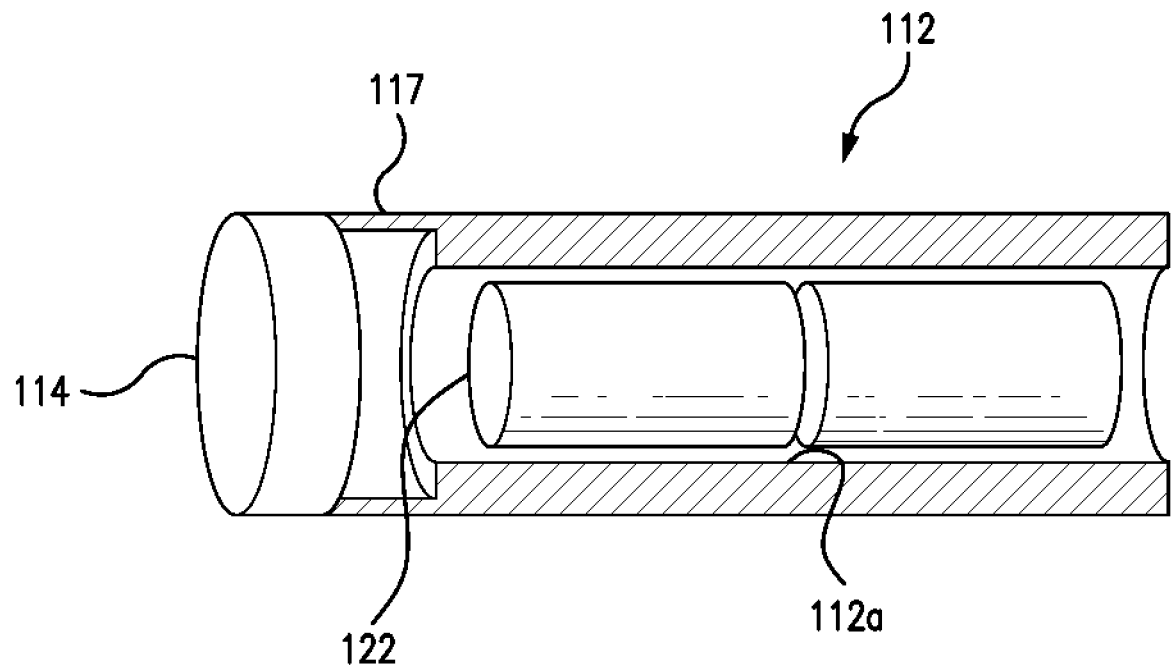
FIGS. 9A and 9B are partial cross-sectional views of the tube sheath embodiment shown in FIG. 8A.
Figure 9B:
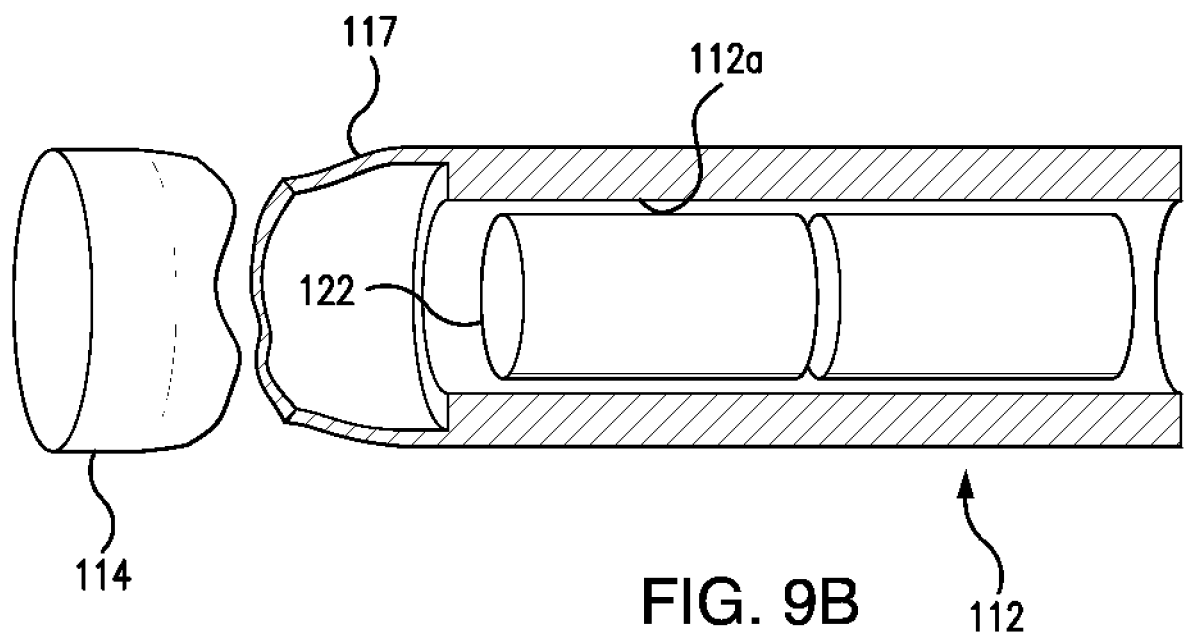

In order to avoid sheath collapse and the corresponding potential issues, alternate embodiments of fuel bundle surrogates can include modifications to the existing design of traditional fissile fuel bundles. For example, a modified fuel bundle surrogate may include a tube sheath 112 that includes a thickened wall portion 112a that extends the length of the tube sheath 112, with the exception of thinner annular end portions 117 disposed at each end of the tube sheath 112, as shown in FIG. 8A. The thickened wall portion 112a provides additional structural stiffness for the tube sheath 112, thereby helping prevent sheath collapse and its related issues. Annular end portions 117 are thinner than thickened wall portion 112a and are configured to receive end caps 114 by way of a welding operation. Whereas the thickened wall portion 112a assists in preventing sheath collapse, the thinner annular end portions 117 facilitate the removal of end caps 114 by way of a standard operation, such as cutting, as shown in FIG. 9B. By preventing sheath collapse yet still allowing for the removal of the end caps 114 by traditional cutting operations, the modified tube sheath 112 facilitates the removal of radiated radioisotope targets 122 (FIG. 9B) by maintaining the structural integrity of the tube sheath. Additionally, prevention of sheath collapse assist in reducing compression stresses on the contents (radioisotope targets 122) of the tube sheaths. In yet another alternate embodiment, as shown in FIG. 8B, the thickened wall portion 112a extends for the entire length of the tube sheath 112.

Figure 10:
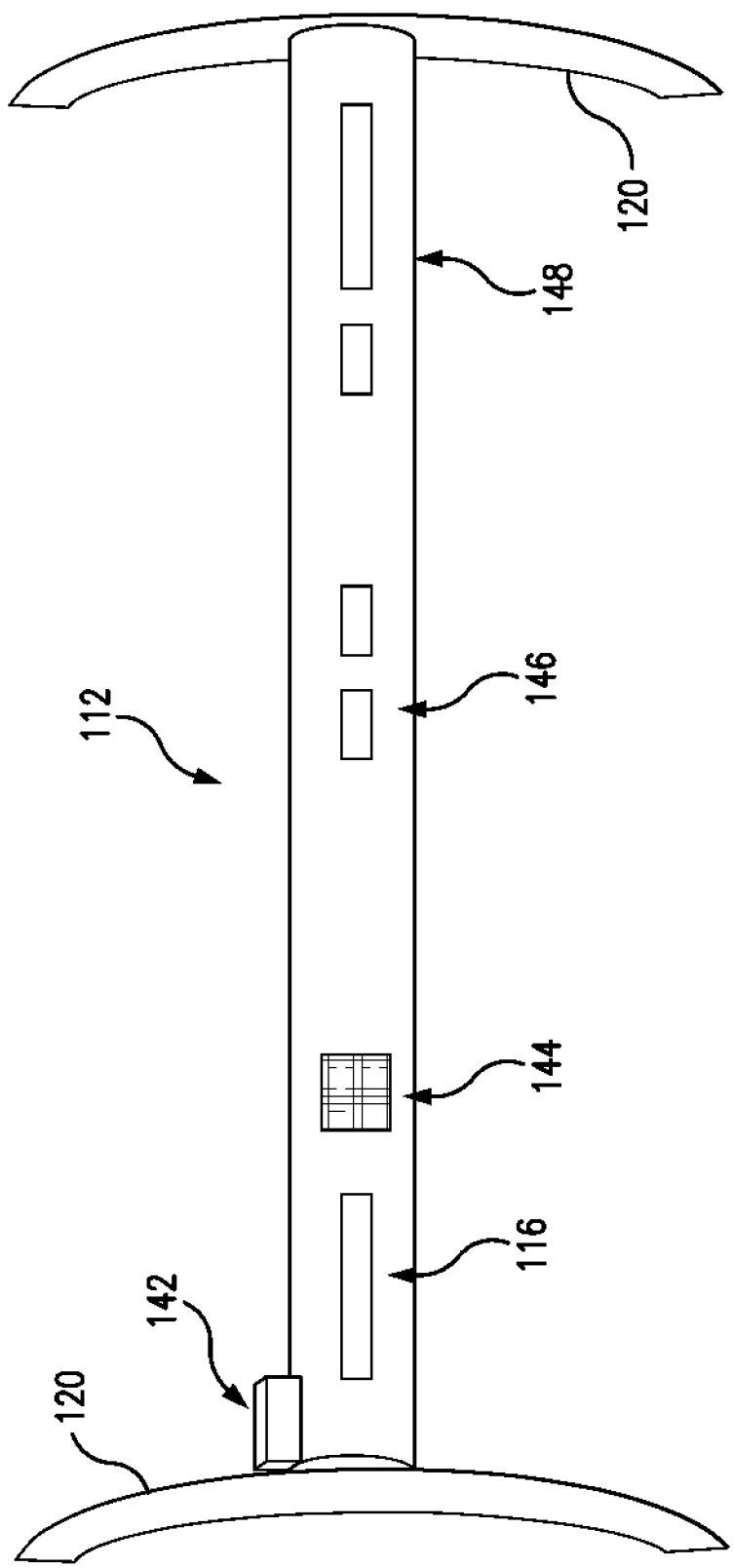
FIG. 10 is a partial view of a fuel bundle surrogate in accordance with the present invention, showing various means of identifying the contents of the fuel bundle surrogate.

Referring now to FIG. 10, embodiments of modified fuel bundles surrogates may include features to facilitate visually distinguishing tube sheaths 112 that include radioisotope targets rather than fissile fuel pellets in order to prevent their unintended use in fissile fuel bundles. For example, tube sheaths 112 of modified fuel bundle surrogates may include modified bearing pads 146 and/or additional bearing pads 148 that are in excess of those found on typical fissile fuels bundles. As shown in FIG. 2B, standard bearing pads 116 of traditional fissile fuel bundles are used to support the fuel bundle within the corresponding pressure tube of the reactor core. Additional distinguishing features may include 1-D or 2-D barcodes 144 that are read by a corresponding barcode reader to obtain identification information of the tube sheath contents. Additionally, an appendage 142 can be provided on the outside surface of the modified tube sheath 112 that prevents the modified tube sheath from being handled by existing automated fissile fuel bundle assembly equipment. Preferably, one or more of these identification features are provided on modified tube sheaths 112 to help prevent the transport of fissile fuel bundles beyond authorized areas and help ensure that only fuel bundle surrogates are transferred to the intended handling and/or processing areas.

Referring back to FIGS. 6D and 6E, another embodiment of a fuel bundle surrogate in accordance with the present disclosure utilizes modular construction so that the fuel bundle surrogate 110 may be used in multiple target irradiation processes, thereby reducing the amount of irradiated scrap materials that must be handled upon completion of each target irradiation process. As shown, modular fuel bundle surrogate 110 includes the same components as the previously discussed embodiments of fuel bundle surrogates, with the primary difference being that the end caps 114 for the tube sheaths 112 are welded to the respective end plates 120 rather than the axial ends of the tube sheaths 112. As such, removal of the end plates 120 from the fuel bundle surrogate 110 also results in the removal of the end caps 114, leaving the tube sheaths 112 open at both ends. In short, end caps 114 create a fluid-tight seal with the corresponding tube sheath 112 without having to be welded thereto, as discussed in greater detail below. Various configurations of end plates are possible as necessary for the modular fuel bundle surrogates 110 to exhibit similar flow resistance to the primary flow as do the fissile fuel bundles. The end plates of modular fuel bundle surrogates may also be thickened in the axial direction to increase their structural integrity since they are reused for multiple radioisotope target irradiation processes.

Figure 11:
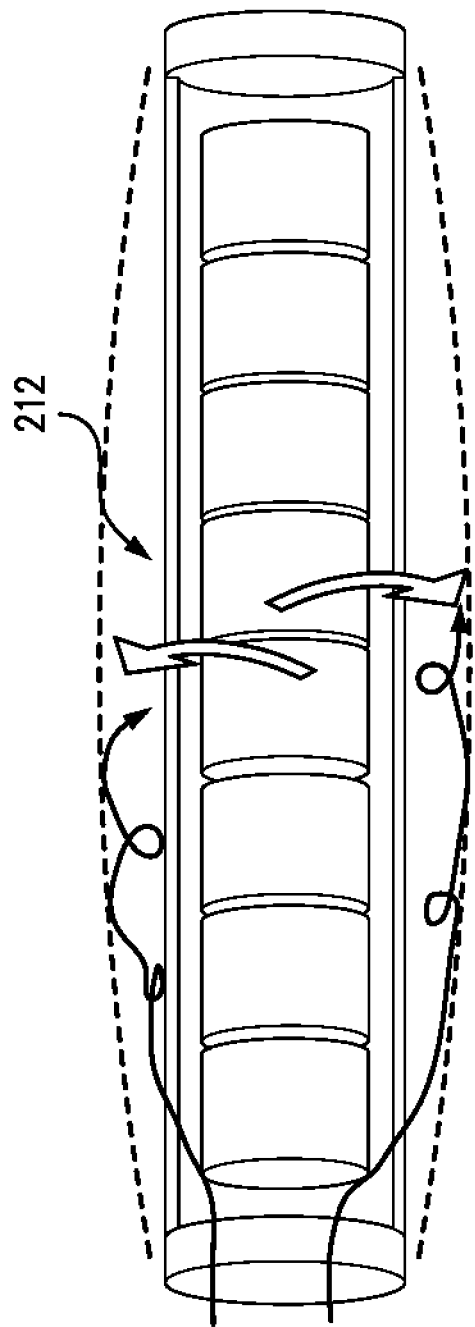
FIG. 11 is a partial cross-sectional view of a prior art tube sheath for a known fissile fuel bundle.
Figure 12:
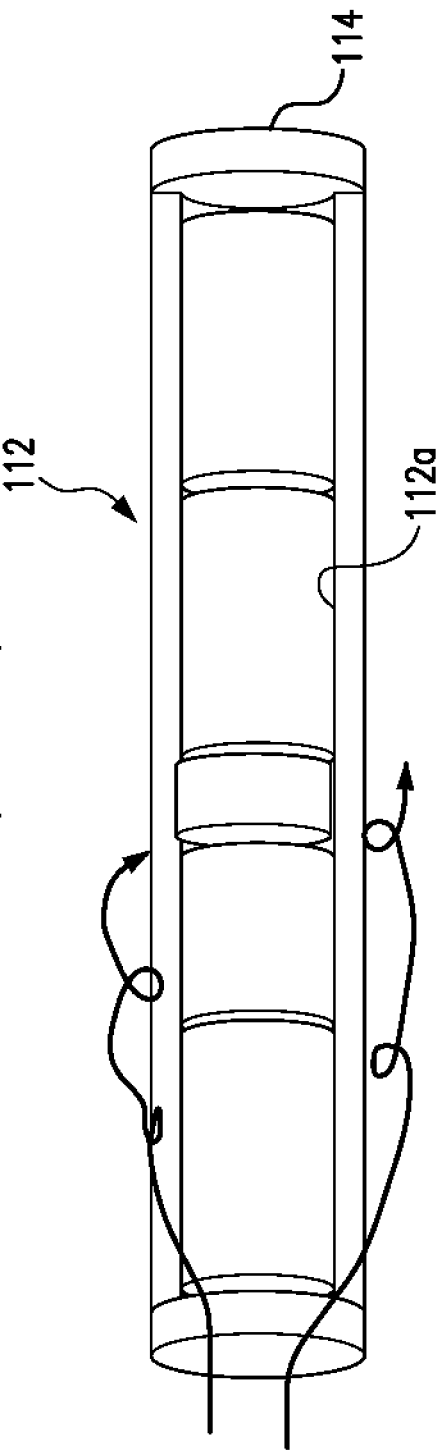
FIG. 12 is a partial cross-sectional view of a tube sheath and associated irradiation targets in accordance with an embodiment of the present invention.

Similarly to the previously discussed embodiments, the tube sheaths of modular fuel bundle surrogates may receive radioisotope targets 122 (FIG. 3A) in which the radioisotope materials are encapsulated. As well, the tube sheaths may receive the radioisotope material directly in the form of powder, solid pellets, sheet stock, disc form, etc. Preferably, the tube sheaths 112 of modular fuel bundle surrogates include thickened walls 112a, as shown in FIG. 12, as compared to the wall portions 212a of the tube sheaths 212 used in traditional fissile fuel bundles (FIG. 11). The thickened wall portions 112a of modular tube sheaths 112 provide additional structural integrity to increase the natural frequency of the tube sheath 112 beyond a level of concern for expected primary flow conditions, thereby avoiding vibrational concerns that may arise regarding thin wall traditional fissile fuel bundles. The increased structural integrity and, therefore, reduced vibrations of the modular tube sheaths 112 can lead to reduced inter-element wear of the components of a modular fuel bundle surrogate over traditional designs.

Figure 13A:
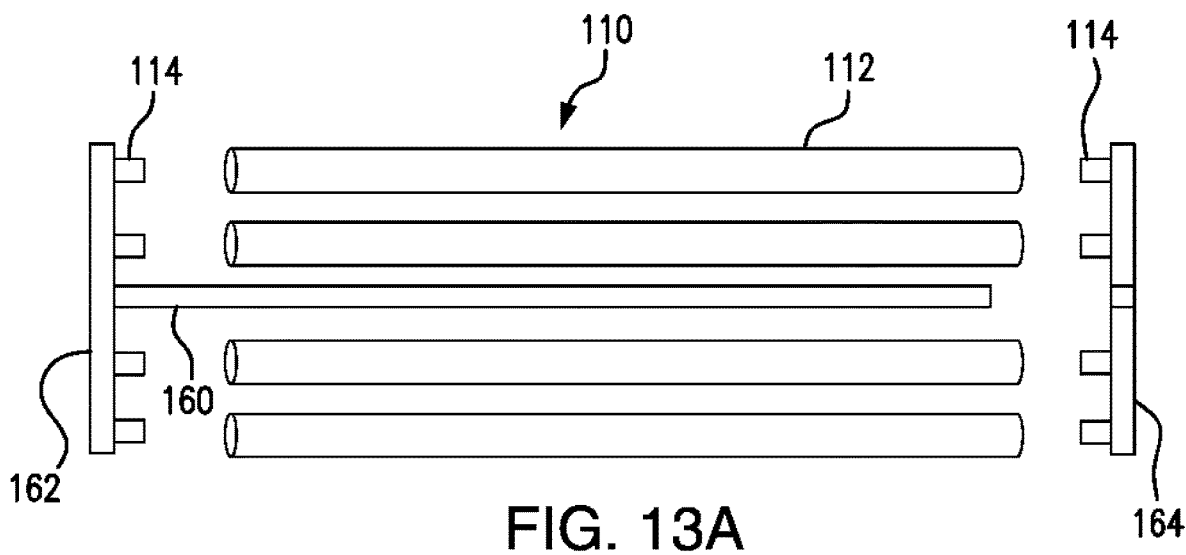
FIGS. 13A through 13C are side views of various embodiments of modular fuel bundle surrogates in accordance with embodiments of the present invention.
Figure 13B:
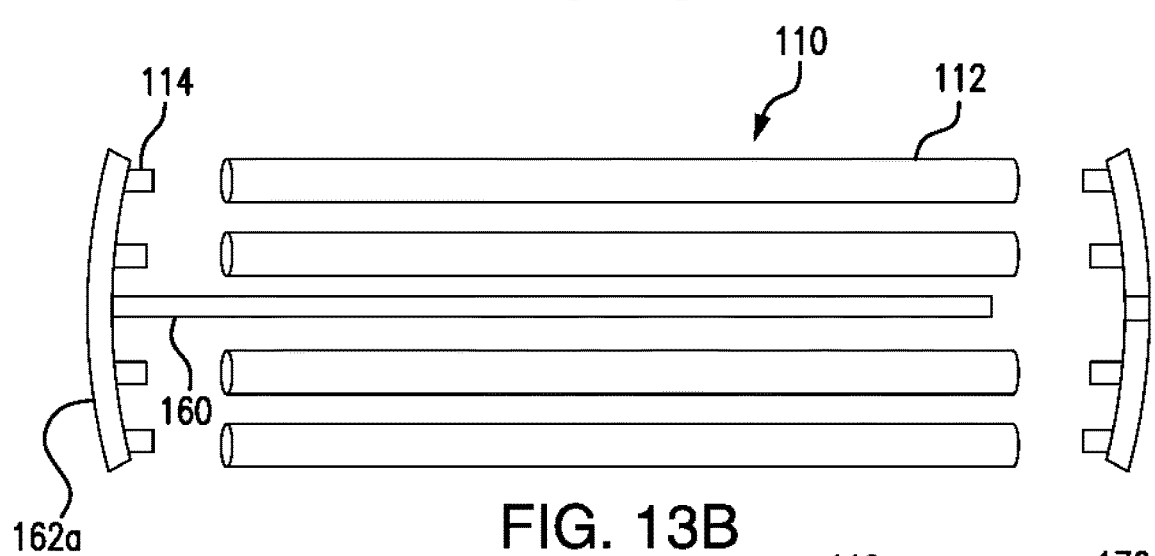
Figure 13C:
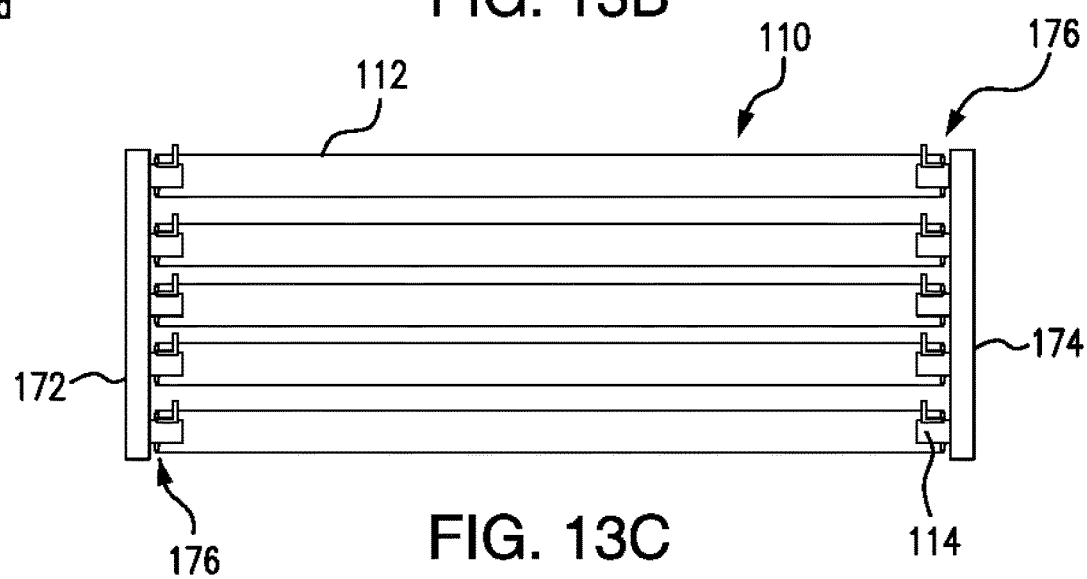

Referring now to FIGS. 13A through 13C, various systems for securing the end plates to the body of the modular fuel bundle surrogate 110 are shown. Referring specifically to FIG. 13A, a central tie-rod 160 that is attached to a first end plate 162 may be secured to a second end plate 164 once the end caps 114 have been engaged with the corresponding ends of the tube sheaths 112. The tie-rod 160 can be secured to second end plate 164 by a removable fastener, a single use breakable restraint, a weld, etc. As shown in FIG. 13B, the embodiment shown in FIG. 13A can be modified by providing slightly curved first and second end plates 162a and 162b, wherein the concave surfaces are disposed adjacent ends of the tube sheaths 112. As the first and second end plates 162a and 164a are drawn together by the central tie-rod 160 and begin to flatten out, they provide an additional spring force that enhances the axial integrity of the modular fuel bundle surrogate 110. As shown in FIG. 13C, an alternate embodiment of a modular fuel bundle surrogate 110 can include first and second end plates 172 and 174 that are secured to opposite ends of the plurality of tube sheaths 112 by spring lock assemblies 176. As shown, each end cap 114 is secured to the corresponding end of a tube sheath 112 with an individual spring lock assembly 176.

Figure 14A:
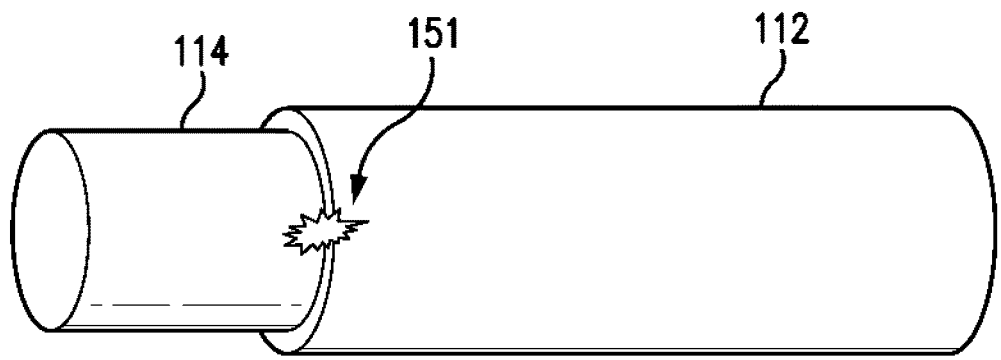
FIGS. 14A through 14D are partial perspective views of a tube sheath and corresponding end cap of a modular fuel bundle surrogate in accordance with an embodiment of the present invention.
Figure 14B:
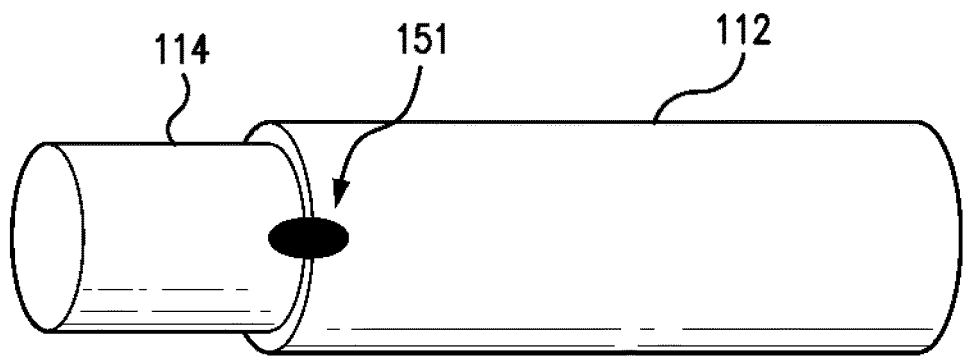
Figure 14C:
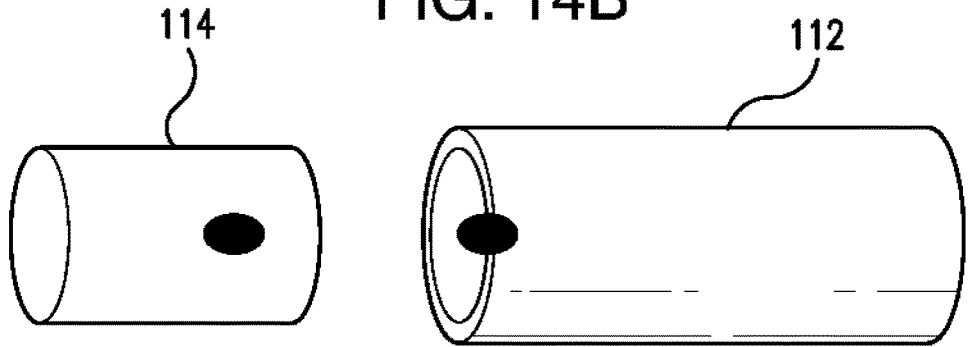
Figure 14D:
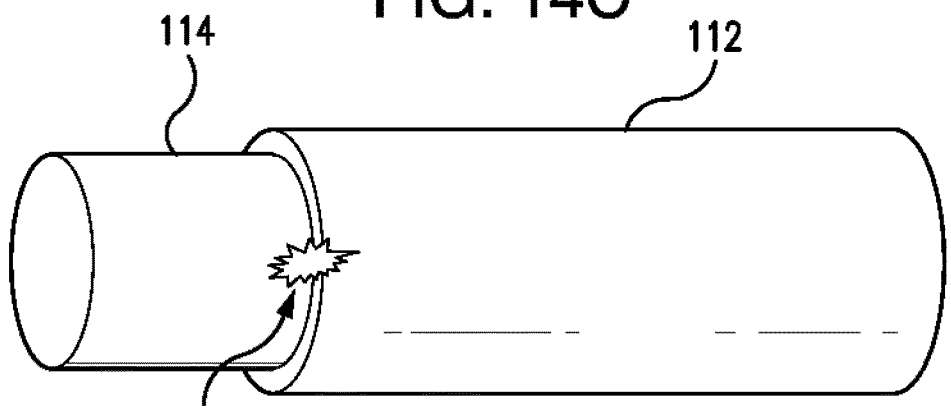

Referring now to FIGS. 14A through 14B, in an alternate embodiment of a modular fuel bundle surrogate, the end plates may be secured to the tube sheath 112 utilizing a multiple re-weld design. As shown in FIG. 14A, a spot weld 151 is used to secure each end cap 114 to an end of a corresponding tube sheath 112, meaning the end plate is secured to the tube sheaths 112 by way of the end caps 114. As shown in FIGS. 14B and 14C, after the target irradiation process is complete, the spot welds 151 are machined away, thereby allowing the end plates to be removed from the tube sheaths 112 and the irradiated target material to be removed. As show in FIG. 14D, prior to a subsequent target irradiation process, other unirradiated targets are disposed within the tube sheaths 112 and the end caps are once again spot welded to the ends of the corresponding tube sheaths 112.

Referring now to FIGS. 15A through 15C, various devices for maintaining the rotational integrity of modular fuel bundle surrogates are shown. As shown in FIG. 15A, the rotation of tube sheath 112 with regard to the end plate 120 can be prevented by use of a tab 178 disposed on the end cap 114 that engages a corresponding slot 180 defined in the tube sheath 112 as the end cap 114 is slidably received therein. As shown in FIG. 15B, the rotation of tube sheath 112 with respect to end plate 120 can be prevented by a spring tab 182 that engages a corresponding hole 184 defined by tube sheath 112 as end cap 114 is slidably received therein. A shown in FIG. 15C, rotation of tube sheath 112 with regard to end plate 120 can be prevented by the engagement of a pair of axially extending pins 190 and 193 that engage corresponding holes 191 and 192, respectively. As shown, pin 190 and hole 192 are disposed on the end of tube sheath 112, and pin 193 and hole 191 are disposed on end plate 120. In addition to the above systems, other methodologies such as temporary welds, friction fit, non-circular cross-sections, interior key and keyway arrangements, etc., between the tube sheaths 112 and end plates 120 may be used to prevent relative rotation between the components.

Figure 16A:
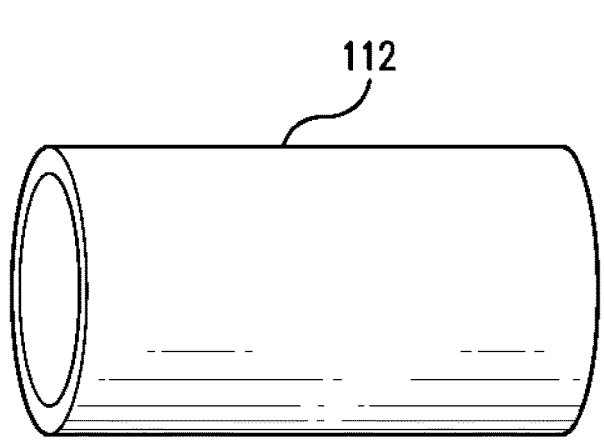
FIGS. 16A through 16C are exploded, partial perspective views of tube sheaths and their corresponding end caps for use with modular fuel bundle surrogates in accordance with embodiments of the present invention Repeat use of reference characters in the present specification and drawings is intended to represent same or analogous features or elements of the invention according to the disclosure.
Figure 16A:
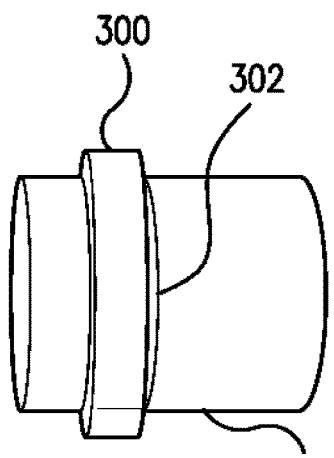
Figure 16B:
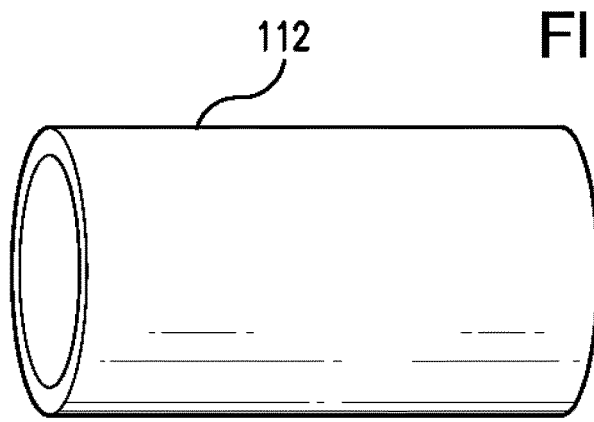
Figure 16B:
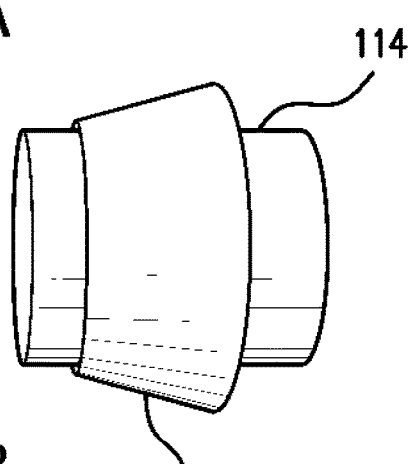
Figure 16C:
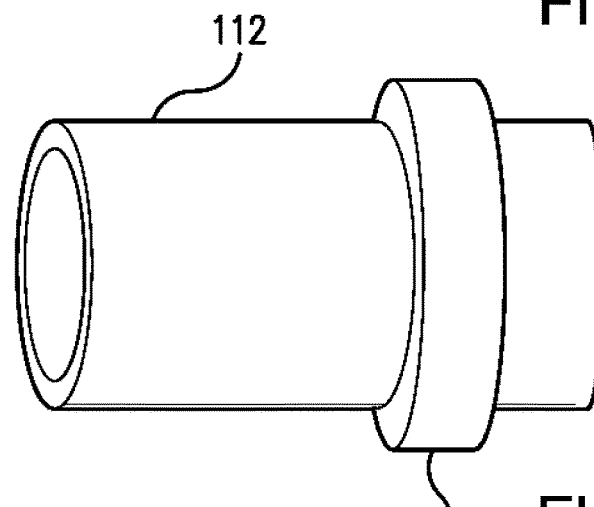
Figure 16C:
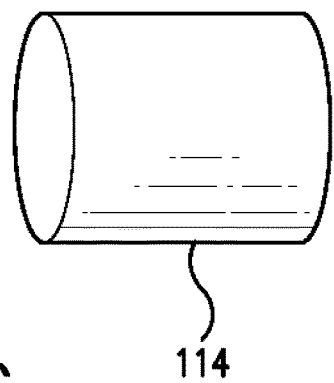

As shown in FIGS. 16A through 16C, various arrangements may be utilized to provide a seal for the tube sheaths of the modular fuel bundle surrogate. As shown in FIG. 16A, a radiation resistant annular seal, such as an O-ring 300, may be received in a groove 302 that is formed in the outer surface and end cap 114. Note, a sprung C-ring, or single use metal crush gasket, may also be used in the embodiment shown in FIG. 16A. As shown in FIG. 16B, a metallic seal can be formed between a frustoconical surface (not shown) formed on the inner wall of the tube sheath 112 and a mating frustoconical surface 304 formed on the end cap 114. Sealing between the two surfaces can be enhanced by the use of compression supplied by one or more tie-rods (not shown) that extend between the end plates of the modular fuel bundle surrogate. As shown in FIG. 16C, an external swage ring 306 may be used to achieve an interference fit with the corresponding end cap 114. The seal between the tube sheath 112 and the end cap 114 may be enhanced by utilizing a soft coating (not shown) on the outer surface of the end cap 114.

Various embodiments of fuel bundle surrogates in accordance with the present disclosure may also include materials other than radioisotope target material within the individual tube sheaths, or fuel bundle surrogate on the whole. For example, some materials that may be disposed within fuel bundle surrogates include, but are not limited to, isotope generating materials, materials for a radiation response research in testing, inert non-fissile filler, depleted uranium, composite fillers to adjust neutron density, as well as fissile material. In instances where fissile material is included in a fuel bundle surrogate, visual and machine-readable identification markers, such as those discussed with regard to FIG. 10 above, are preferably utilized with each tube sheath 112 to prevent fissile materials from being improperly transferred to lab or production facilities. As well, different materials may be disposed along the length of each tube sheath. For example, differing materials may be disposed along the length of a tube sheath to affect the dynamic response of the tube sheath in the primary flow.

Additionally, multiple research or isotope materials may be disposed in one element, or may be disposed in differing tube sheaths within the fuel bundle surrogate to take advantage of different flux due to self-shielding within the bundle. For example, neutron transparent materials may be disposed in outer rings of a fuel bundle surrogate, whereas denser materials are disposed toward the bundle center to optimize distribution of flux within the fuel bundle surrogate or to reduce the impact of flux disturbance between adjacent fuel channels. As well differing lengths and densities of materials may be altered along the axial length of a tube sheath in order to maintain the desired dynamic response of the tube sheath within the primary flow. For example, lighter materials may be disposed at the ends of tube sheaths where the impact to natural frequency is less, and heavy materials may be disposed toward the middle of the tube sheaths. As well, shorter segments of materials may be utilized for higher flexibility, resulting in lower natural frequency. Similarly allowing for more clearance between materials and the tube sheath wall allows for higher flexibility and, therefore, lower natural frequency.

While one or more preferred embodiments of the invention are described above, it should be appreciated by those skilled in the art that various modifications and variations can be made in the present invention without department from the scope and spirit thereof. It is intended that the present invention cover such modifications and variations as come within the scope and spirit of the appended claims and their equivalents.

The invention claimed is:

1. A method of irradiating a target material in a heavy water reactor for the production of an isotope, comprising the steps of:
   providing a first target comprised of a first target material suitable for producing the isotope by way of a neutron capture event, the first target being disposed within a surrogate fuel bundle;
   placing the surrogate fuel bundle in a pressure tube of a fuel channel of the heavy water reactor along with a plurality of non-fissile bundles axially aligned with the surrogate fuel bundle so as to position the surrogate fuel bundle at a selected location in the pressure tube; and
   irradiating the target.

2. The method of claim 1, wherein the heavy water reactor is a CANDU reactor.

3. The method of claim 1, further comprising the step of removing the surrogate fuel bundle after a predetermined residency time in a flux field of the reactor, whereby the first target is irradiated.

4. The method of claim 3, further comprising transferring the irradiated first target to a processing facility.

5. The method of claim 1, wherein the step of providing a target further comprises:
   providing the surrogate fuel bundle in a form including a plurality of tube sheaths that extends between a pair of opposed end plates; and
   placing the target into a first one of the tube sheaths.

6. The method of claim 5, further comprising providing a non-fissile material in the surrogate fuel bundle.

7. The method of claim 5, further comprising the steps of:
   providing a second target comprised of a second material suitable for producing a radioisotope by way of a neutron capture event; and
   placing the second target into a second sheath tube of the plurality of sheath tubes of the surrogate fuel bundle.

8. The method of claim 1, wherein the step of providing a first target further comprises providing an outer capsule defining an interior volume, wherein the first target material is disposed in the interior volume.

9. The method of claim 8, wherein the outer capsule is comprised of the first target material.

10. The method of claim 1, wherein the placing step involves placing the surrogate fuel bundle in a primary fluid side of the pressure tube.

11. The method of claim 1, wherein the placing step involves placing the surrogate fuel bundle in a secondary fluid side of the pressure tube.

12. The method of claim 6, wherein the non-fissile material is placed in a radially outer sheath of the surrogate fuel bundle relative to the target.

13. The method of claim 1, wherein at least one fissile bundle is located in said pressure tube in axial alignment with said surrogate fuel bundle.

14. The method of claim 1, wherein at least one of the plurality of non-fissile bundles is located upstream of the surrogate fuel bundle and at least another one of the plurality of non-fissile bundles is located downstream of the surrogate fuel bundle in the pressure tube.

15. The method of claim 1, wherein the surrogate fuel bundle contains a plurality of targets of the first target material.

16. The method of claim 15, wherein the first target material comprises Mo-98.

17. The method of claim 1, further comprising the step of:
 removing the fuel bundle surrogate from the pressure tube after the target is irradiated.

18. The method of claim 17, wherein the removing step further comprises:
 leaving a second fuel bundle surrogate in the pressure tube after the fuel bundle surrogate is removed so that a second target comprised of a second target material suitable for producing the isotope by way of a neutron capture event may be further irradiated.

19. The method of claim 18, wherein the first target material and the second target material each comprise Mo-98.

* * * * *